United States Patent
Kumazaki et al.

(10) Patent No.: US 8,882,632 B2
(45) Date of Patent: Nov. 11, 2014

(54) CONTROL DEVICE OF VEHICLE POWER TRANSMISSION DEVICE

(75) Inventors: Kenta Kumazaki, Toyota (JP); Atsushi Tabata, Okazaki (JP); Tooru Matsubara, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 29 days.

(21) Appl. No.: 13/881,665

(22) PCT Filed: Oct. 27, 2010

(86) PCT No.: PCT/JP2010/069115
§ 371 (c)(1),
(2), (4) Date: Apr. 25, 2013

(87) PCT Pub. No.: WO2012/056540
PCT Pub. Date: May 3, 2012

(65) Prior Publication Data
US 2013/0210575 A1    Aug. 15, 2013

(51) Int. Cl.
| | |
|---|---|
| *B60W 10/08* | (2006.01) |
| *B60W 10/10* | (2012.01) |
| *B60W 20/00* | (2006.01) |
| *F16H 61/06* | (2006.01) |
| *B60W 30/19* | (2012.01) |
| *B60W 10/115* | (2012.01) |
| *B60K 6/48* | (2007.10) |
| *B60W 30/18* | (2012.01) |
| *F16H 63/50* | (2006.01) |
| *F16H 61/00* | (2006.01) |

(52) U.S. Cl.
CPC .............. *B60W 10/08* (2013.01); *B60W 20/00* (2013.01); *F16H 61/061* (2013.01); *Y02T 10/6221* (2013.01); *B60W 30/19* (2013.01); *F16H 2061/0087* (2013.01); *B60W 10/115* (2013.01); *B60W 10/10* (2013.01); *B60K 6/48* (2013.01); *B60W 30/18072* (2013.01); *F16H 63/502* (2013.01)
USPC .................................. 477/3; 477/20; 477/110

(58) Field of Classification Search
USPC .......................... 477/3, 18, 20, 110
See application file for complete search history.

(56) References Cited

U.S. PATENT DOCUMENTS

| | | | |
|---|---|---|---|
| 7,922,618 B2 * | 4/2011 | Matsubara et al. ............... | 477/3 |
| 2008/0208422 A1 | 8/2008 | Shibata et al. | |
| 2009/0112416 A1 * | 4/2009 | Heap et al. ...................... | 701/54 |
| 2009/0118931 A1 * | 5/2009 | Kaminsky et al. .............. | 701/54 |
| 2012/0004064 A1 | 1/2012 | Kumazaki et al. | |

FOREIGN PATENT DOCUMENTS

| | | |
|---|---|---|
| JP | 2008-207690 A | 9/2008 |
| JP | 2010-215040 A | 9/2010 |
| JP | 2011-199959 A | 10/2011 |

* cited by examiner

Primary Examiner — Edwin A Young
(74) Attorney, Agent, or Firm — Kenyon & Kenyon LLP

(57) ABSTRACT

It is provided a control device of a vehicle power transmission device having an automatic transmission shifted by engagement and release of hydraulic friction engagement devices to selectively establish a plurality of gear stages and an electric motor coupled to an input shaft of the automatic transmission in a power transmittable manner, the control device executing a clutch-to-clutch shift while performing regeneration through the electric motor at the time of a coast down shift of the automatic transmission, the control device completing regenerative torque reduction control to reduce a regenerative torque of the electric motor in a torque phase of the coast down shift before start of the torque phase in accordance with a drop-off of an output torque of the vehicle power transmission device.

18 Claims, 10 Drawing Sheets

| | C1 | C2 | B1 | B2 | B3 | F1 |
|---|---|---|---|---|---|---|
| 1st | ○ | | | ◎ | | △ |
| 2nd | ○ | | ○ | | | |
| 3rd | ○ | | | | ○ | |
| 4th | ○ | ○ | | | | |
| 5th | | ○ | | | ○ | |
| 6th | | ○ | ○ | | | |
| R | | | | ○ | ○ | |
| N | | | | | | |

◎ OPERATED DURING ENGINE BRAKING

△ OPERATED ONLY DURING DRIVING

|  | C1 | C2 | C3 | B1 | B2 | F1 |
|---|---|---|---|---|---|---|
| 1st | O |  |  |  | (O) | O |
| 2nd | O |  |  | O |  |  |
| 3rd | O | O |  |  |  |  |
| 4th |  | O |  | O |  |  |
| Rev |  |  | O |  | O |  |
| N |  |  |  |  |  |  |

CONTROL DEVICE OF VEHICLE POWER TRANSMISSION DEVICE

CROSS REFERENCE TO RELATED APPLICATIONS

This is a 371 national phase application of PCT/JP2010/069115 filed 27 Oct. 2010, the contents of which are incorporated herein by reference.

FIELD OF THE INVENTION

The present invention relates to a control device of a vehicle power transmission device executing a clutch-to-clutch shift at the time of a coast down shift of an automatic transmission while performing regeneration through an electric motor coupled to an input shaft of the automatic transmission in a power transmittable manner.

BACKGROUND OF THE INVENTION

A control device of a vehicle power transmission device is well known that includes an automatic transmission shifted by engagement and release of hydraulic friction engagement devices (hereinafter, engagement devices) to selectively establish a plurality of gear stages and an electric motor coupled to an input shaft of the automatic transmission in a power transmittable manner so that a clutch-to-clutch shift is executed while performing regeneration through the electric motor at the time of a coast down shift of the automatic transmission. For example, this corresponds to a control device of a vehicle drive device described in Patent Document 1.

During clutch-to-clutch shift of the automatic transmission associated with regeneration through the electric motor, it is conceivable that, for example, a regenerative torque from the electric motor, i.e., an electric motor torque (transmission input torque) is varied in accordance with a change in rotation of the electric motor during an inertia phase to perform an equal power shift not changing regenerative power (=regenerative torque×electric motor rotation speed) (see broken lines of FIG. 8). However, since an engagement-side engagement device starts having a torque capacity to change a gear ratio to a post-shift gear ratio in a torque phase during the clutch-to-clutch shift before a change in rotation of the electric motor in the inertia phase and an inertia torque is generated in the inertia phase, if the equal power shift is performed, a drop-off D is generated in torque on the output side of the automatic transmission (e.g., transmission output torque) in the torque phase and the inertia phase (see broken lines of FIG. 8). Since it is concerned that such a drop-off D of the transmission output torque is made larger when the clutch-to-clutch shift is executed while the regenerative torque is larger, a proposal has been made to provide regenerative torque reduction control of temporarily reducing the regenerative torque in the torque phase and the inertia phase (see solid lines of FIG. 8). For example, torque-phase compensation control reducing the regenerative torque is provided during the torque phase to compensate the drop-off D of the transmission output torque in the torque phase (see A of FIG. 8), and inertia-phase compensation control reducing the regenerative torque is provided during the inertia phase to cancel the inertia torque (see B of FIG. 8). These compensation controls suppress the drop-off D of the transmission output torque (see C of FIG. 8).

On the other hand, in the clutch-to-clutch shift of the automatic transmission, it is desired to suppress a shift shock while properly ensuring shift responsiveness. Therefore, for example, an oil pressure command value is set in consideration of the shift shock suppression, the shift responsiveness, etc., in hydraulic control of the engagement devices in the clutch-to-clutch shift. However, a shift shock may unexpectedly be increased due to temporal change etc., of hydraulic control components (e.g., components such as friction materials (friction plates) making up the engagement devices, clutch plates, pistons, and return springs) of the automatic transmission and operating oil. Therefore, a proposal has also been made to provide oil pressure learning control of sequentially detecting a degree of change in transmission input rotation speed during the clutch-to-clutch shift to set the next oil pressure command value in the direction suppressing the shift shock. For example, the learning control of a release oil pressure of a release-side engagement device is provided such that an undershoot amount of the transmission input rotation speed converges to a target before the inertia phase, and the learning control of an engagement oil pressure of the engagement-side engagement device is provided such that a change rate of the transmission input rotation speed converges to a target during the inertia phase.

PRIOR ART DOCUMENT

Patent Document

Patent Document 1: Japanese Laid-Open Patent Publication No. 2008-207690

SUMMARY OF THE INVENTION

Problem to Be Solved by the Invention

It is believed that the change tendency of the oil pressure command value in the oil pressure learning control is hardly uniquely applied to different types of shifts such as power-on upshift and coast down shift. Therefore, it is desired to provide the learning control of an oil pressure command value for each type of shift to set respective oil pressure learning values to be applied. Particularly, since a coast down shift without power-on facilitates a feeling of a shift shock and it is believed that weight is put on the suppression of the shift shock rather than the shift responsiveness, an oil pressure learning value applied to the coast down shift is desirably set when the coast down shift is performed. However, in the clutch-to-clutch shift for the coast down shift associated with regeneration, for example, if undershoot occurs in the transmission input rotation speed during the torque phase, it is difficult to determine whether the undershoot is caused because a rise in engagement oil pressure is too late (or a reduction in release oil pressure is too early) or because a regenerative torque (transmission input torque) is changed by the torque-phase compensation control, which may make the learning control of the oil pressure command value difficult. The problem as described above is not known and no proposal has been made on providing the proper learning control of the oil pressure command value of the engagement device related to the clutch-to-clutch shift in the coast down shift associated with regeneration.

The present invention was conceived in view of the situations and it is therefore an object of the present invention to provide a control device capable of properly providing oil pressure learning control of engagement devices related to a clutch-to-clutch shift for a coast down shift associated with regeneration in a vehicle power transmission device including an electric motor coupled to an input shaft of an automatic transmission in a power transmittable manner.

Means for Solving the Problems

To achieve the object, the present invention provides (a) a control device of a vehicle power transmission device having an automatic transmission shifted by engagement and release of hydraulic friction engagement devices to selectively establish a plurality of gear stages and an electric motor coupled to an input shaft of the automatic transmission in a power transmittable manner, the control device executing a clutch-to-clutch shift while performing regeneration through the electric motor at the time of a coast down shift of the automatic transmission, (b) the control device completing regenerative torque reduction control to reduce a regenerative torque of the electric motor in a torque phase of the coast down shift before start of the torque phase in accordance with a drop-off of an output torque of the vehicle power transmission device.

The Effects of the Invention

Consequently, since the regenerative torque reduction control to reduce a regenerative torque of the electric motor in a torque phase of the coast down shift is completed before the start of the torque phase in accordance with a drop-off of an output torque of the vehicle power transmission device, the regenerative torque (i.e., the transmission input torque) can stably be output, i.e., can be maintained constant, during the torque phase. As a result, the behavior associated with the clutch-to-clutch shift during torque phase (e.g., a degree of change in the transmission input rotation speed) can entirely be attributable to the hydraulic control of the engagement devices, thereby ensuring the proper provision of the oil pressure learning control of the engagement devices related to the clutch-to-clutch shift for the coast down shift associated with regeneration. Since the regenerative torque (i.e., the transmission input torque) is already reduced before the start of the torque phase and the absolute value of the transmission input torque in the torque phase is made smaller as compared to the case of providing the regenerative torque reduction control during the torque phase, the drop-off amount of the transmission output torque (having the same meaning as the vehicle acceleration etc.) in the torque phase is also made smaller. This suppresses the effect on the shift shock due to completion of the regenerative torque reduction control before the start of the torque phase. As a result, also because the proper provision of the oil pressure learning control properly suppresses the shift shock, the drivability is improved.

Preferably, the regenerative torque reduction control is started at the time of output of a shift command for executing the clutch-to-clutch shift. Consequently, a period from the output of the shift command until the start of the torque phase can be utilized to properly complete the regenerative torque reduction control before the start of the torque phase. Therefore, although the start timing of the regenerative torque reduction control is equivalent to the start of the hydraulic control of the clutch-to-clutch shift, since the oil pressure responsiveness is slower than the electric motor torque responsiveness, the regenerative torque reduction control can be terminated before the torque phase is actually started.

Preferably, the regenerative torque reduction control is started when output of a shift command for executing the clutch-to-clutch shift is predicted. Consequently, the regenerative torque reduction control can properly be completed before the start of the torque phase by utilizing a period from when the output of the shift command is predicted (e.g., during a period from the time when a shift determination is made from a shift map etc, until the output of the shift command) until the start of the torque phase. The start timing of the regenerative torque reduction control is made earlier than the start of the hydraulic control of the clutch-to-clutch shift and the regenerative torque reduction control can more certainly be terminated before the start of the torque phase. For example, when the regenerative torque change rate is made larger at the time of the regenerative torque reduction control, an uncomfortable feeling is more easily given. Therefore, the regenerative torque change rate cannot be made larger even if the regenerative torque before a shift is relatively larger. As a result, if the regenerative torque reduction control is started at the same time with the start of the hydraulic control (the start of the output of the shift command) for the clutch-to-clutch shift, the regenerative torque reduction control may not be terminated before the start of the torque phase. In this regard, when the start timing of the regenerative torque reduction control is made earlier than the start of the hydraulic control of the clutch-to-clutch shift, the regenerative torque reduction control can more certainly be terminated before the start of the torque phase.

Preferably, the regenerative torque reduction control is provided within a range of a predetermined regenerative torque change rate. Consequently, even if the regenerative torque reduction control is provided before the start of the torque phase instead of during the torque phase, a user hardly feels a change in the output torque of the vehicle power transmission device (change in the vehicle acceleration) and an increase in the shift shock can be suppressed to improve the drivability.

Preferably, learning control of an oil pressure command value of the hydraulic friction engagement devices involved with the clutch-to-clutch shift is provided such that a change in input shaft rotation speed of the automatic transmission converges to a target value or such that an undershoot amount of the input shaft rotation speed of the automatic transmission converges during the coast down shift of the automatic transmission. Consequently, a degree of change in the transmission input rotation speed and an undershoot amount of the transmission input rotation speed during the torque phase can entirely be attributable to the hydraulic control of the engagement devices, thereby ensuring the proper provision of the oil pressure learning control of the engagement devices related to the clutch-to-clutch shift of the coast down shift associated with regeneration.

Preferably, the vehicle power transmission device includes a differential portion coupled to an input shaft of the automatic transmission in a power transmittable manner, wherein the differential portion is an electric differential device having the electric motor coupled in a power transmittable manner on the output side and having a differential mechanism coupled to an engine in a power transmittable manner and a differential electric motor coupled to the differential mechanism in a power transmittable manner such that a differential state of the differential mechanism is controlled by controlling an operating state of the differential electric motor, and wherein if the differential electric motor outputs a regenerative torque or a drive torque in addition to regeneration through the electric motor at the time of a coast down shift of the automatic transmission, an input torque change rate of the automatic transmission in the regenerative torque reduction control is reduced as compared to the case that the differential electric motor does not output the regenerative torque or the drive torque. Consequently, although a user more easily feels a change in the output torque of the vehicle power transmission device (change in the vehicle acceleration) if the regenerative torque reduction control reduces the transmission input torque that is a total torque of the regenerative torque from the electric motor and the engine direct torque from the differential electric motor because of the inclusion of the easily varying engine direct torque as compared to the case that the regenerative torque reduction control reduces only the regenerative torque from the electric motor, since the change rate of the automatic transmission input torque is reduced in the regenerative torque reduction control, a user hardly feels the change of the output torque (change in the vehicle acceleration).

Preferably, if the input torque change rate in the regenerative torque reduction control is reduced, start timing of the regenerative torque reduction control is made earlier as compared to the case of not reducing the input torque change rate. Consequently, although the regenerative torque reduction control may not be terminated before the torque phase is actually started because of the reduction in the input torque change rate in the regenerative torque reduction control, since the start timing of the regenerative torque reduction control is made earlier, the regenerative torque reduction control can be terminated before the torque phase is actually started.

Preferably, that the differential electric motor outputs the drive torque means that a portion or whole of regenerative electric power from the electric motor is consumed by the differential electric motor because of input limitation of an electric storage device giving/receiving electric power to/from the differential electric motor and the electric motor. Consequently, a user hardly feels a change in the output torque (change in the vehicle acceleration) of the vehicle power transmission device even during the input limitation of the electric storage device.

DETAILED DESCRIPTION

Figure 1:
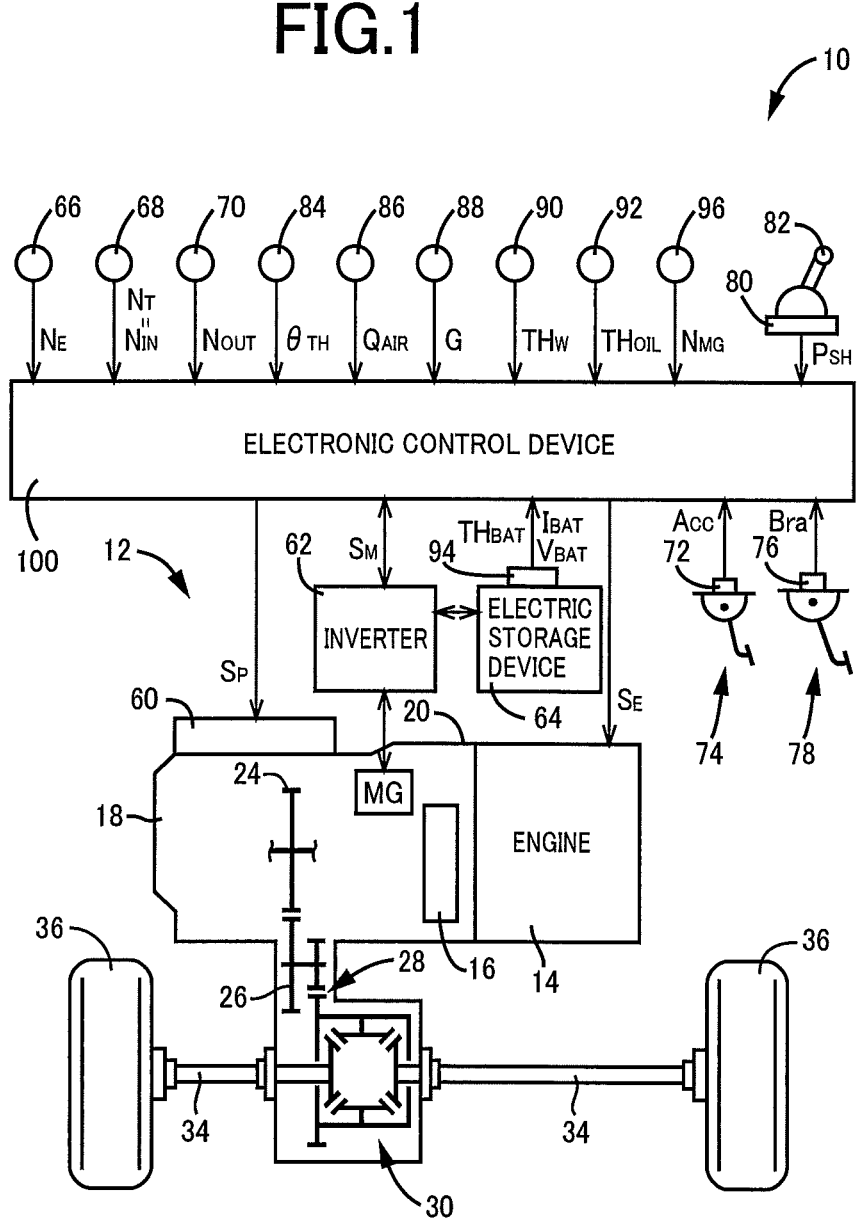
FIG. 1 is a diagram for explaining a general configuration of a power transmission path making up a vehicle to which the present invention is applied and is a diagram for explaining a main portion of a control system disposed in the vehicle.

In the present invention, preferably, the automatic transmission is a stepped automatic transmission with a plurality of gear ratios mechanically set in a stepwise manner. For example, this stepped automatic transmission is made up of various planetary-gear type multistage transmissions having, for example, four forward speeds, five forward speeds, six forward speeds, or more gear stages with a plurality of sets of rotating elements of a planetary gear device selectively coupled by engagement devices to achieve a plurality of gear stages (shift stages) in an alternative manner. Engagement devices such as multi-plate and single-plate clutches and brakes engaged by a hydraulic actuator or belt type brakes are widely used for the engagement devices in the planetary-gear type multistage transmission. Although an oil pump supplying operating oil for actuating the engagement devices may be, for example, an oil pump driven by a drive force source for running (e.g., an engine or an electric motor) to discharge the operating oil, the oil pump may be driven by a dedicated electric motor disposed separately from the drive force source for running.

Preferably, it is desirable in terms of responsiveness that a hydraulic control circuit including the engagement devices directly supplies, for example, an output oil pressure of a linear solenoid valve to each of hydraulic actuators (hydraulic cylinders) of the engagement devices; however the output oil pressure of the linear solenoid valve can be used as a pilot oil pressure to control a shift control valve such that the operating oil is supplied from the control valve to the hydraulic actuators.

Preferably, the linear solenoid valves are disposed in one-to-one correspondence to each of a plurality of engagement devices, for example; however various other forms are available and, for example, if a plurality of the engagement devices exists that is not engaged or subjected to the engagement/release control at the same time, a linear solenoid valve common to these devices can be disposed. The hydraulic control of all the hydraulic friction engagement devices may not necessarily be provided by the linear solenoid valves, and the hydraulic control may partially or entirely be provided by a regulating means other than the linear solenoid valves such as duty control of an ON-OFF solenoid valve. The phrase "supplying an oil pressure" as used herein means that "causing an oil pressure to act on" or "supplying operating oil controlled to the oil pressure".

Preferably, the differential mechanism is a device having three rotating elements, i.e., a first rotating element coupled to the engine, a second rotating element coupled to the differential electric motor, and a third rotating element coupled to the electric motor for running. The differential mechanism is a single pinion type planetary gear device; the first rotating element is a carrier of the planetary gear device; the second rotating element is a sun gear of the planetary gear device; and the third rotating element is a ring gear of the planetary gear device. The engine is an internal combustion engine, such as a gasoline engine and a diesel engine.

Embodiments of the present invention will be described in detail with reference to the drawings.

First Embodiment

Figures 2, 3:
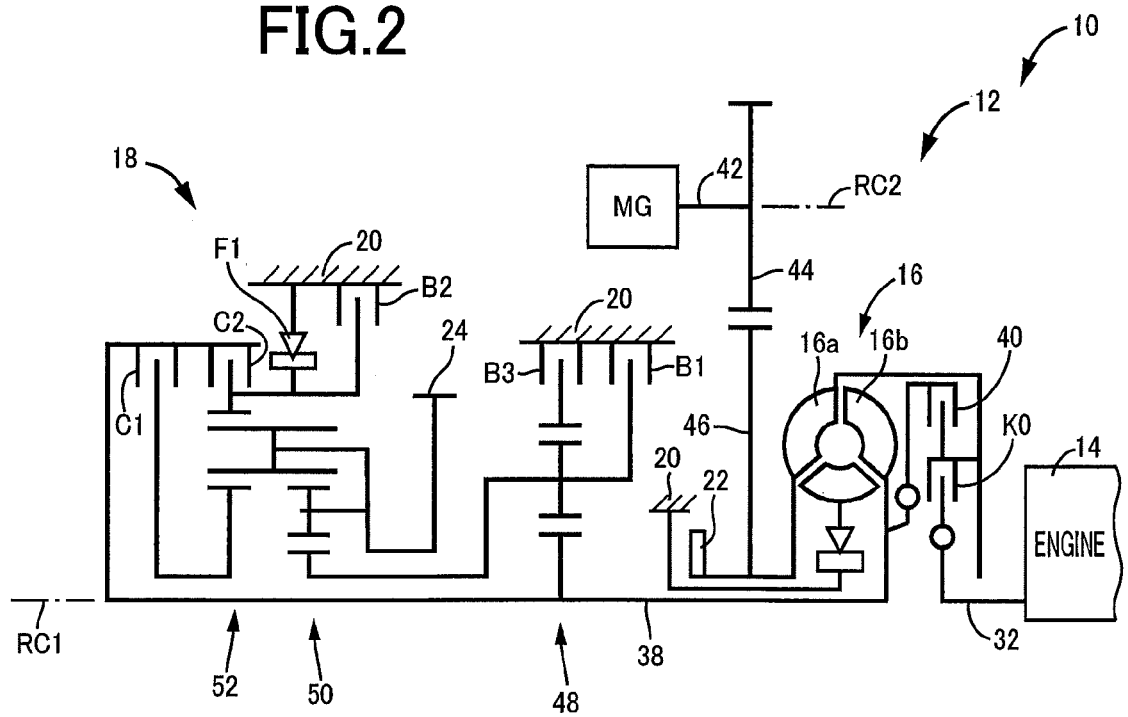
FIG. 2 is a schematic for explaining a vehicle power transmission device.
FIG. 3 is an operation table for explaining a relationship between a shift operation of an automatic transmission and a combination of an operation of engagement devices used therein.

FIG. 1 is a diagram for explaining a general configuration of a power transmission path from an engine 14 to drive wheels 36 making up a vehicle 10 to which the present invention is applied and is a diagram for explaining a main portion of a control system disposed in the vehicle 10 for output control of the engine 14, shift control of an automatic transmission 18, drive control of an electric motor MG etc. FIG. 2 is a schematic for explaining a vehicle power transmission device 12 (hereinafter referred to as the power transmission device 12). A torque converter 16, the automatic transmission 18, etc., are configured substantially symmetrically relative to a center line (a first axial center RC1) and lower halves from the center line are not depicted in FIG. 2. The first axial center RC1 of FIG. 2 is a rotational axial center of the engine 14 and the torque converter 16 and a second axial center RC2 is a rotational axial center of the electric motor MG.

In FIGS. 1 and 2, the power transmission device 12 has a transaxle case (T/A case) 20 (hereinafter referred to as the case 20) as a non-rotating member attached to a vehicle body by bolts etc., includes an engine intermittent clutch K0, the torque converter 16, an oil pump 22, and the automatic transmission 18 in the case 20 on the first axial center RC1 in order, i.e., in series, from the side of the engine 14, and includes the electric motor MG rotationally driven around the second axial center RC2 parallel to the first axial center RC1. The power transmission device 12 includes a counter driven gear 26 engaged with an output gear 24 that is an output rotating member of the automatic transmission 18, a final gear pair 28, and a differential gear device (differential gear) 30 coupled via the final gear pair 28 to the counter driven gear 26 in the case 20. The power transmission device 12 configured as described above is preferably used in the vehicle 10 of the FF (front-engine front-drive) type, for example. In the power transmission device 12, if the engine intermittent clutch K0 is engaged, the power of engine 14 is transmitted from an engine coupling shaft 32 coupling the engine 14 and the engine intermittent clutch K0, sequentially through the engine intermittent clutch K0, the torque converter 16, the automatic transmission 18, the counter driven gear 26, the final gear pair 28, the differential gear device 30, a pair of axles 34, etc., to a pair of the drive wheels 36.

The engine intermittent clutch K0 is a wet multi-plate type hydraulic friction engagement device in which a plurality of friction plates overlapped with each other is pressed by a hydraulic actuator, and is subjected to engagement/release control by a hydraulic control circuit 60 disposed in the power transmission device 12 by using an oil pressure generated by the oil pump 22 as an original pressure. In the engagement/release control, a power-transmittable torque capacity of the engine intermittent clutch K0, i.e., an engagement force of the engine intermittent clutch K0 is varied, for example, continuously, through pressure regulation of a linear solenoid valve etc., in the hydraulic control circuit 60. The engine intermittent clutch K0 includes a pair of clutch rotating members (a clutch hub and a clutch drum) relatively rotatable around the first axial center RC1 in the released state thereof and one of the clutch rotating members (the clutch hub) is relatively non-rotatably coupled to the engine coupling shaft 32 while the other clutch rotating member (the clutch drum) is relatively non-rotatably coupled to a pump impeller 16a of the torque converter 16. Because of such a configuration, the engine intermittent clutch K0 rotates the pump impeller 16a integrally with the engine 14 via the engine coupling shaft 32 in the engaged state. Therefore, in the engaged state of the engine intermittent clutch K0, the drive force from the engine 14 is input to the pump impeller 16a. On the other hand, in the released state of the engine intermittent clutch K0, the power transmission between the pump impeller 16a and the engine 14 is interrupted.

The torque converter 16 is a hydraulic transmission device disposed to rotate around the first axial center RC1 and transmitting a drive force input to the pump impeller 16a via fluid toward the automatic transmission 18. The pump impeller 16a is coupled sequentially through the engine intermittent clutch K0 and the engine coupling shaft 32 to the engine 14 and is an input-side rotating element receiving the input of the drive force from the engine 14 and rotatable around the first axial center RC1. A turbine impeller 16b of the torque converter 16 is an output-side rotating element of the torque converter 16 and is relatively non-rotatably coupled to a transmission input shaft 38 that is an input shaft of the automatic transmission 18 by the spline fitting, etc. The torque converter 16 includes a lockup clutch 40. The lockup clutch 40 is a direct clutch disposed between the pump impeller 16a and the turbine impeller 16b and is put into an engaged state, a slip state, or a released state by hydraulic control etc.

The electric motor MG is a so-called motor generator having a function as a motor generating a mechanical drive force from electric energy and a function of an electric generator generating electric energy from mechanical energy. In other words, the electric motor MG may act as a power source generating a drive force for running instead of the engine 14 that is a power source or along with the engine 14. The electric motor MG also performs operations such as generating electric energy through regeneration from a drive force generated by another power source or a driven force (mechanical energy) input from the side of the drive wheels 36 to supply to accumulate the electric energy via an inverter 62 into an electric storage device 64. The electric motor MG has the rotational axial center that is the second axial center RC2 different from the first axial center RC1, and is operatively coupled to the pump impeller 16a via an electric motor output shaft 42 and an electric motor output gear 44 rotatable around the second axial center RC2 and an electric motor coupling gear 46 etc., rotatable around the first axial center RC1. As a result, power is mutually transmitted between the electric motor MG and the pump impeller 16a via the electric motor output gear 44, the electric motor coupling gear 46, etc. Therefore, the electric motor MG is coupled to the transmission input shaft 38 in a power transmittable manner as is the case with the engine 14. In this embodiment, the pitch circle diameter of the electric motor output gear 44 is smaller than the pitch circle diameter of the electric motor coupling gear 46. Therefore, since the number of teeth of the electric motor output gear 44 is smaller than the number of teeth of the electric motor coupling gear 46, the rotation of the electric motor MG is reduced and transmitted to the pump impeller 14a. In other words, an output torque $T_{MG}$ of the electric motor MG (hereinafter referred to as the electric motor torque $T_{MG}$) is amplified and transmitted from the electric motor MG to the pump impeller 16a.

The oil pump 22 is a mechanical oil pump coupled to the pump impeller 16a and rotationally driven by the engine 14 (or the electric motor MG) to generate an operating oil pressure for providing the shift control of the automatic transmission 18, controlling the torque capacity of the lockup clutch 40, controlling engagement/release of the engine intermittent clutch K0, and supplying lubricant oil to the portions of the power transmission path of the vehicle 10.

The automatic transmission 18 is a planetary-gear type multistage transmission making up a portion of the power transmission path between the engine 14 and the drive wheels 36 and acting as a stepped automatic transmission shifted to selectively establish a plurality of shift stages (gear stages) by changing status(es) of some of the hydraulic friction engagement devices between the engaged state and released state (i.e., engagement and release of the hydraulic friction engagement devices). The automatic transmission 18 is, for example, a stepped transmission executing a so-called clutch-to-clutch shift frequently used in known vehicles. The automatic transmission 18 has a first planetary gear device 48 of the single pinion type as well as a second planetary gear device 50 of the double pinion type and a third planetary gear device 52 of the single pinion type configured to be the Ravigneaux type on the same axis line (on the first axial center RC1) and changes the speed of the rotation of the transmission input shaft 38 to output the rotation from the output gear 24. The transmission input shaft 38 corresponds to an input member of the automatic transmission 18 and is a turbine shaft rotationally driven by the turbine impeller 16b of the torque converter 16 in this embodiment. The output gear 24 corresponds to an output member of the automatic transmission 18 and mutually engages with the counter driven gear 26 to make up one gear pair together with the counter driven gear 26.

Each of the first planetary gear device 48, the second planetary gear device 50, and the third planetary gear device 52 has three rotating elements made up of a sun gear, a carrier supporting a pinion gear in a rotatable and revolvable manner, and a ring gear engaging via the pinion gear with the sun gear as is well known. The three rotating elements of each of the devices are partially coupled to each other or coupled to the transmission input shaft 38, the case 12, or the output gear 24 directly or indirectly (or selectively) via the hydraulic friction engagement devices (clutches C1, C2 and brakes B1, B2, and B3) and a unidirectional clutch F1.

The clutches C1, C2 and the brakes B1, B2, B3 (hereinafter simply referred to as clutches C, brakes B, or engagement devices if not particularly distinguished) are hydraulic friction engagement devices frequently used in known vehicle automatic transmissions and are made up of wet multi-plate type clutches and brakes pressed by the hydraulic actuator, a band brake fastened by the hydraulic actuator, etc. The clutches C and the brakes B configured as described above are respectively subjected to the engagement/release control by a hydraulic control circuit 60 such that respective torque capacities, i.e., engagement forces are varied, for example, continuously, through pressure regulation of a linear solenoid valve etc., in the hydraulic control circuit 60, thereby selectively coupling members on the both sides of the engagement devices interposed therebetween.

The engagement/release control of each of the clutches C and the brakes B establishes each gear stage (each shift stage) of six forward speeds and one reverse speed as depicted in an engagement operation table of FIG. 3 depending on accelerator operation of a driver, a vehicle speed V, etc. In FIG. 3, "1st" to "6th" mean the first to sixth speed forward gear stages; "R" means the reverse gear stage; "N" means a neutral state having no gear stage established; and gear ratios γ (=input rotation speed $N_{IN}$/output rotation speed $N_{OUT}$) of the automatic transmission 18 corresponding to the gear stages are appropriately determined by gear ratios γ(=the number of sun gear teeth/the number of ring gear teeth) ρ1, ρ2, and ρ3 of the first planetary gear device 48, the second planetary gear device 50, and the third planetary gear device 52. The engagement operation table of FIG. 3 summarizes the relationship between the gear stages and the operation states of the clutches C and the brakes B with "circles" indicative of engagement, a "double circle" indicative of engagement only during engine brake, and blanks indicative of release.

Returning to FIG. 1, the vehicle 10 includes an electronic control device 100 including a control device of the power transmission device 12 related to the shift control of the automatic transmission 18, for example. The electronic control device 100 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 100 provides the hybrid drive control related to the engine 14 and the electric motor MG including regenerative control of the electric motor MG, the shift control of the automatic transmission 18, the torque capacity control of the lockup clutch 40, the torque capacity control of the engine intermittent clutch K0, etc., and is configured separately for the hybrid control and the hydraulic control as needed.

The electronic control device 100 is supplied with, for example, a signal indicative of an engine rotation speed $N_E$ that is the rotation speed of the engine 14 detected by an engine rotation speed sensor 66; a signal indicative of a turbine rotation speed $N_T$ of the torque converter 16 as an input rotation speed of the automatic transmission 18 detected by a turbine rotation speed sensor 68, i.e., a transmission input rotation speed $N_{IN}$ that is the rotation speed of the transmission input shaft 38; a signal indicative of a transmission output rotation speed $N_{OUT}$ that is the rotation speed of the output gear 24 corresponding to the vehicle speed V detected by an output shaft rotation speed sensor 70; a signal indicative of an accelerator opening degree Acc that is an operation amount of an accelerator pedal 74 as a drive force request amount (driver request output) for the vehicle 10 from a driver detected by an accelerator opening degree sensor 72; a signal indicative of a brake operation amount Bra that is an operation amount of a brake pedal 78 as a braking force request amount (driver request deceleration) for the vehicle 10 from a driver detected by a foot brake sensor 76; a signal indicative of a lever position (shift operation position, shift position, operation position) $P_{SH}$ of a shift lever 82, such as known "P", "N", "D", "R", and "S" positions, detected by a shift position sensor 80; a signal indicative of a throttle valve opening degree $\theta_{TH}$ that is an opening degree of an electronic throttle valve not depicted detected by a throttle sensor 84; a signal indicative of an intake air amount $Q_{AIR}$ of the engine 14 detected by an intake air amount sensor 86; a signal indicative of longitudinal acceleration G (or longitudinal deceleration G) of the vehicle 10 detected by an acceleration sensor 88; a signal indicative of a cooling water temperature $TH_w$ of the engine 14 detected by a cooling water temperature sensor 90; a signal indicative of an oil temperature $TH_{OIL}$ of the operating oil in the hydraulic control circuit 60 detected by an oil temperature sensor 92; signals indicative of a battery temperature $TH_{BAT}$, a battery input/output current (battery charging/discharging current) $I_{BAT}$, and a battery voltage $V_{BAT}$ of the electric storage device 64 detected by a battery sensor 94; and a signal indicative of an electric motor rotation speed $N_{MG}$ that is the rotation speed of the electric motor MG detected by an electric motor rotation speed sensor 96. The electronic control device 100 sequentially calculates a state of charge (charging capacity) SOC of the electric storage device 64 based on the battery temperature $TH_{BAT}$, the battery charging/discharging current $I_{BAT}$, and the battery voltage $V_{BAT}$, for example.

The electronic control device 100 outputs, for example, an engine output control command signal $S_E$ for the output control of the engine 14; an electric motor control command signal $S_M$ for controlling actuation of the electric motor MG; and an oil pressure command signal $S_P$ for actuating an electromagnetic valve (solenoid valve) included in the hydraulic control circuit 60 for controlling the hydraulic actuators of the engine intermittent clutch K0 and the clutches C and the brakes B of the automatic transmission 18.

Figure 4:
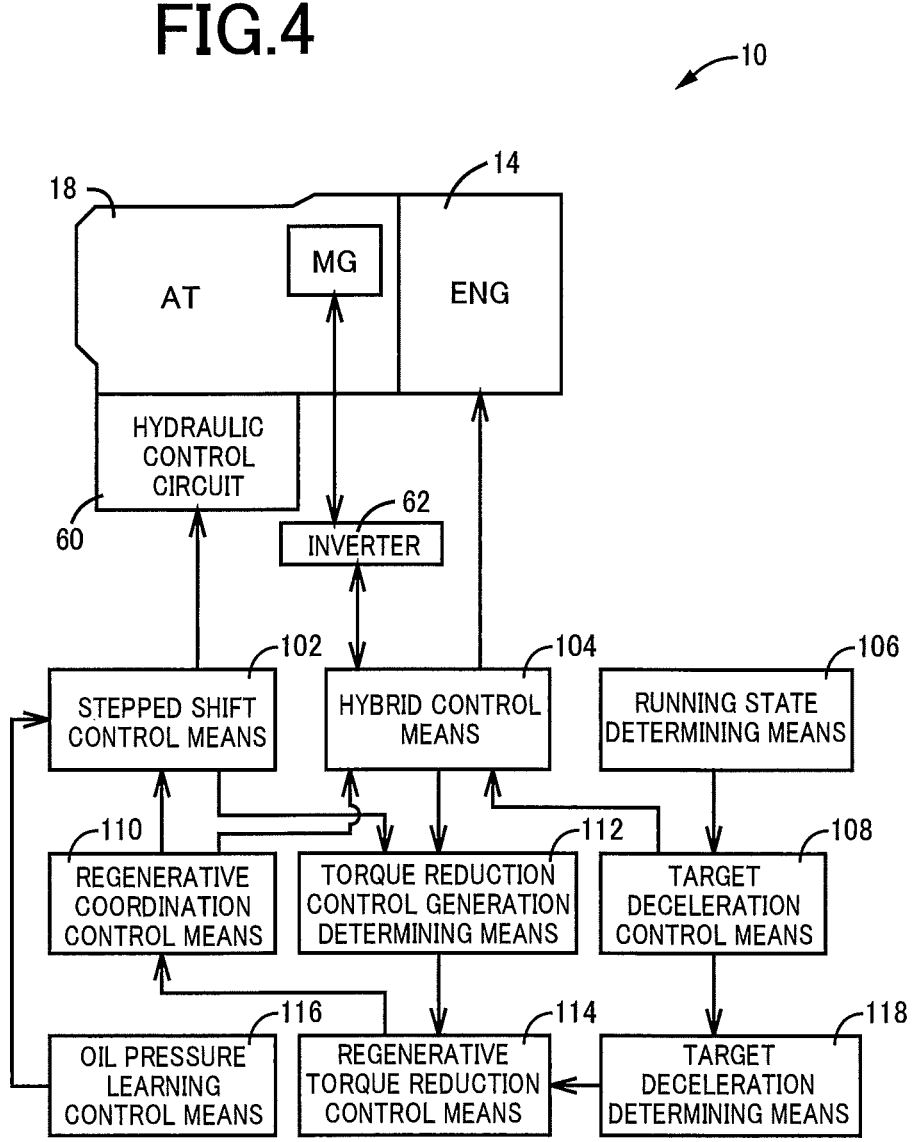
FIG. 4 is a functional block diagram for explaining a main portion of the control function of the electronic control device.

FIG. 4 is a functional block diagram for explaining a main portion of the control function of the electronic control device 100. In FIG. 4, a stepped shift control portion, i.e., a stepped shift control means 102 acts as a shift control means performing a shift of the automatic transmission 18. For example, the stepped shift control means 102 determines whether a shift of the automatic transmission 18 should be performed, i.e., determines a shift stage to be achieved by the automatic transmission 18, based on a vehicle state indicated by an actual vehicle speed V and a required output torque $T_{OUT}$ of the automatic transmission 18 corresponding to the accelerator opening degree Acc etc., from known relationship (shift diagram, shift map) having upshift lines and downshift lines stored in advance by using the vehicle speed V, the output torque (transmission output torque) $T_{OUT}$ of the automatic transmission 18 (or the accelerator opening degree Acc etc.,) as variables, and provides automatic shift control of the automatic transmission 18 such that the determined shift stage is acquired. In this case, the stepped shift control means 102 outputs to the hydraulic control circuit 60 a command (shift output command, oil pressure command) $S_P$ causing engagement and/or release of the engagement devices involved with the shift of the automatic transmission 18, i.e., a command causing the execution of for example, a clutch-to-clutch shift by releasing release-side engagement devices and engaging engagement-side engagement devices involved with the shift of the automatic transmission 18 such that the shift stage is achieved in accordance with the engagement operation table depicted in FIG. 3, for example. The hydraulic control circuit 60 activates the linear solenoid valves in the hydraulic control circuit 60 to actuate the hydraulic actuators of the engagement devices involved with the shift such that the shift of the automatic transmission 18 is performed by, for example, releasing the release-side engagement devices and engaging the engagement-side engagement devices in accordance with the command $S_P$.

A hybrid control portion, i.e., the hybrid control means 104 has a function as an engine drive control means controlling the drive of the engine 14 and a function as an electric motor operation control means controlling the operations of the electric motor MG as a drive force source or an electric generator through the inverter 62, and provides control of the hybrid drive by the engine 14 and the electric motor MG through these control functions.

Specifically, for example, if engine running is performed by using the engine 14 as the drive force source for running, the hybrid control means 104 engages the engine intermittent clutch K0, thereby transmitting the drive force from the engine 14 to the pump impeller 16a. During the engine running, the hybrid control means 104 causes the electric motor MG operatively coupled to the pump impeller 16a to output an assist torque as needed. On the other hand, for example, if EV running (motor running) is performed by using the electric motor MG as the drive force source for running with the engine 14 stopped, the hybrid control means 104 releases the engine intermittent clutch K0 to interrupt the power transmission path between the engine 14 and the torque converter 16 and causes the electric motor MG to output the drive force for running.

For example, during vehicle stop such as when the running vehicle 10 temporarily stops, the hybrid control means 104 releases the engine intermittent clutch K0 to stop the engine 14 and causes the electric motor MG to rotationally drive the oil pump 22 and to output a creep torque. When the creep torque is output, the drive force from the electric motor MG is transmitted via the torque converter 16 to the drive wheels 36 and, therefore, the output of the creep torque is easily controlled such that the uncomfortable feeling of passengers is suppressed.

For example, when the engine 14 is started, the hybrid control means 104 engages the engine intermittent clutch K0 to rotate the engine 14 with the electric motor torque $T_{MG}$ for engine start. The same applies to the case of starting the engine 14 during EV running and, in this case, the electric motor MG is caused to output the electric motor output acquired by adding the output for engine start to the output for vehicle running.

The hybrid control means 104 provides regenerative control putting the engine 14 into the non-driving state to convert kinetic energy of the vehicle 10 transmitted from the drive wheels 36 into electric energy with the electric motor MG to improve the fuel efficiency (reduce a fuel consumption rate) during the inertia running (during coasting) when the acceleration is turned off and when a wheel brake is actuated by operating the brake pedal 78. Specifically, the hybrid control means 104 provides the regenerative control rotationally driving and causing the electric motor MG to operate as an electric generator by a reverse drive force transmitted from the drive wheels 36 toward the engine 14 so as to charge the electric storage device 64 via the inverter 62 with the electric energy, i.e., an electric-motor generation current. In other words, the hybrid control means 104 functions as a regenerative control means providing the regenerative control. This regenerative control is controlled to achieve a regenerative amount determined based on braking force distribution of a braking force from a hydraulic brake (wheel brake) for acquiring a braking force corresponding to the state of charge SOC of the electric storage device 64 and the brake operation amount Bra, for example.

During coasting of the vehicle 10, a target deceleration G* (driver request deceleration) corresponding to the brake operation amount Bra is set and a braking torque (braking force) is generated such that the target deceleration G* is achieved. Although this braking force is acquired from, for example, regeneration, an engine brake, and a hydraulic brake, the braking force from regeneration is given the highest priority in consideration of energy efficiency and if a greater braking force is necessary or if a regenerative amount is limited due to input limitation of the electric storage device 64, a braking force from the hydraulic brake is added to the braking force from regeneration. For example, when the target deceleration G* is achieved by the regeneration and the hydraulic brake during deceleration when acceleration is turned off, the hybrid control means 104 releases the engine intermittent clutch K0 and the operation of the engine 14 is stopped by a fuel cut on the condition that warm-up of the engine and catalyst is completed. Therefore, occurrence of pumping loss due to drag (rotation resistance) of the engine 14 is suppressed and the braking force (deceleration) is accordingly suppressed, increasing a regeneration amount.

Specifically, returning to FIG. 4, a running state determining portion, i.e., a running state determining means 106 determines whether the vehicle 10 is decelerating with acceleration turned off, i.e., coasting, based on the acceleration opening degree Acc. The running state determining means 106 determines based on the shift position $P_{SH}$ whether the vehicle 10 is running at a "D (drive)" position that is a forward automatic transmission running position (range) for providing the automatic shift control or at an "S" position (or "M" position) that is a forward manual transmission running position for achieving a manual transmission running mode to set a so-called shift range limiting shift stages on the high-speed side in the automatic shift control (or for achieving a manual transmission running mode to set a shift stage with manual operation).

If the miming state determining means 106 determines that the vehicle 10 is decelerating, a target deceleration control portion, i.e., a target deceleration control means 108 calculates the target deceleration G* (driver request deceleration) during deceleration and generates a braking torque of the vehicle such that the target deceleration G* is achieved. The target deceleration control means 108 calculates the target deceleration G* during deceleration based on the actual vehicle speed V and the brake operation amount Bra from relationship among the vehicle speed V, the brake operation amount Bra, and the target deceleration G* empirically obtained and stored in advance such that the target deceleration G* is made larger when the vehicle speed V is higher or when the brake operation amount Bra is larger, for example. The target deceleration control means 108 determines distribution between a braking torque from the electric motor MG (regenerative torque) and a braking torque from the hydraulic brake (wheel brake torque) based on the calculated target deceleration G* from relationship (braking force distribution map) empirically obtained and set in advance with the highest priority given to acquiring the braking force for achieving the target deceleration G* from the regenerative torque, for example. The target deceleration control means 108 outputs, for example, a command to the hybrid control means 104 so as to acquire the determined regenerative torque and outputs a command to a wheel brake device not depicted controlling the hydraulic brake so as to acquire the determined wheel brake torque. The hybrid control means 104 performs regeneration through the electric motor MG at a regenerative amount achieving the determined regenerative torque in accordance with the command. In this case, the hybrid control means 104 stops the fuel supply to the engine 14 by, for example, a fuel injection device at the same time and releases the engine intermittent clutch K0. Additionally, the wheel brake device actuates the hydraulic brake at an oil pressure achieving the determined wheel brake torque in accordance with the command.

During coasting of the vehicle 10 associated with the regenerative control by the hybrid control means 104, a downshift line may be reached as the vehicle speed V decreases and a downshift of the automatic transmission 18 (hereinafter referred to as a coast down shift) may be determined, resulting in the execution of the coast down shift. If the gear ratio γ is made larger by a downshift of the automatic transmission 18 during the regenerative control, the transmission input torque acting as the regenerative torque from the electric motor MG is made larger by an increase in the gear ratio γ and transmitted toward the output gear 24. Therefore, at the time of a coast down shift of the automatic transmission 18 when the regenerative torque from the electric motor MG is added, a regenerative coordination control portion (regenerative coordination shift control portion), i.e., a regenerative coordination control means (regenerative coordination shift control means) 110 outputs to the hybrid control means 104 a command causing a gradual decrease in the regenerative torque from the electric motor MG generated before the coast down shift from the start time point of the inertia phase during the coast down shift such that the regenerative torque is made smaller by an increase in the electric motor rotation speed $N_{MG}$ at the end time point of the coast down shift for regenerative coordination control (regenerative coordination coast down control). The regenerative coordination control means 110 outputs a command causing this coast down shift to be executed by a clutch-to-clutch shift to stepped shift control means 102. As described above, during a clutch-to-clutch shift of the automatic transmission 18 associated with regeneration through the electric motor MG for example, the regenerative torque from the electric motor MG acting as the electric motor torque $T_{MG}$ (transmission input torque $T_{IN}$) is varied in accordance with an increase in the electric motor rotation speed $N_{MG}$ during the inertia phase to perform an equal power shift not changing regenerative power (=regenerative torque×electric motor rotation speed).

On the assumption of the regenerative coordination coast down control, the output torque of the power transmission device corresponding to the vehicle acceleration G (vehicle deceleration G), i.e., the transmission output torque $T_{OUT}$ has substantially the equal degree before and after a gear shift of the coast down shift associated with regeneration. However, in the torque phase during clutch-to-clutch shift transition, the engagement-side engagement device starts having a torque capacity and the gear ratio γ of the automatic transmission 18 is changed from a Hi-gear ratio to a Lo-gear ratio while an inertia torque is generated due to a change in rotation of the rotating elements of the automatic transmission 18 in the inertia phase. Therefore, when the regenerative coordination coast down control is provided, a temporal drop-off D is generated in the transmission output torque $T_{OUT}$ in the torque phase and the inertia phase (see broken lines of FIG. 8). A change in the vehicle acceleration G (i.e., increase in the vehicle deceleration G) due to the drop-off D of the transmission output torque $T_{OUT}$ may be felt as a shift shock, giving an uncomfortable feeling to a driver. In this regard, in this embodiment, regenerative torque reduction control is provided to temporarily reduce the regenerative torque from the electric motor MG in the torque phase and the inertia phase so as to suppress such a drop-off D of the transmission output torque $T_{OUT}$ (see solid lines of FIG. 8). For example, in the regenerative torque reduction control, torque-phase compensation control is provided that reduces the regenerative torque from the electric motor MG while the transmission output torque $T_{OUT}$ temporarily drops in the torque phase during the clutch-to-clutch shift transition, compensating the drop-off D of the torque in the torque phase (see A of FIG. 8). Additionally, in the regenerative torque reduction control, inertia-phase compensation control is provided that reduces the regenerative torque from the electric motor MG in the inertia phase during the clutch-to-clutch shift transition to cancel the inertia torque, compensating the drop-off D of the torque in the inertia phase (see B of FIG. 8). These compensation controls suppress the drop-off D of the transmission output torque $T_{OUT}$ (see C of FIG. 8).

The inertia phase during the clutch-to-clutch shift transition can be identified as a section in which the electric motor rotation speed $N_{MG}$ (transmission input rotation speed $N_{IN}$) changes from a pre-shift synchronous rotation speed (=transmission output rotation speed $N_{OUT}$×pre-shift gear ratio (Hi-gear ratio)) to a post-shift synchronous rotation speed (=$N_{OUT}$×post-shift gear ratio (Lo-gear ratio)), for example. The torque phase during the clutch-to-clutch shift transition is a section before the start of the inertia phase and the start of the torque phase can be identified as a time point when the engagement-side engagement device starts having a torque capacity and the gear ratio γ of the automatic transmission 18 starts changing to the post-shift gear ratio, causing the transmission output torque $T_{OUT}$ to start dropping despite the fact that the transmission input torque $T_{IN}$ is substantially constant (or even increased), for example. From another viewpoint, the start of the torque phase can be identified as a time point when the oil pressure command value of the engagement-side engagement device starts rising from the oil pressure command value empirically obtained and set in advance as a maximum engagement oil pressure causing no torque capacity in the engagement-side engagement device; after shift output (after output of the oil pressure command value for the shift), for example. However, in terms of control, the start of the torque phase may be determined after the elapse of a predetermined time (i.e., a torque-phase start prediction time) from the start of the shift output empirically obtained and set in advance. In this case, this predetermined time may be set for each type of shift such as whether upshift or downshift and shift stages between which a shift is made, or may be set from a map empirically obtained and set in advance by using the oil temperature $TH_{OIL}$ of the operating oil and the vehicle speed V as parameters.

Specifically, a torque reduction control generation determining unit, i.e., a torque reduction control generation determining means 112 determines whether a predetermined shift of the automatic transmission 18 occurs that is preset as a shift requiring the regenerative torque reduction control. For example, the torque reduction control generation determining means 112 determines whether the stepped shift control means 102 determines a downshift of the automatic transmission 18 based on an actual vehicle state from the shift map during coasting of the vehicle 10 associated with the regenerative control by the hybrid control means 104, i.e., whether a coast down shift is determined in a regenerative range for the predetermined shift.

If the torque reduction control generation determining means 112 determines the predetermined shift, a regenerative torque reduction control portion, i.e., a regenerative torque reduction control means 114 provides the regenerative torque reduction control on the assumption of the regenerative coordination coast down control by the regenerative coordination control means 110. For example, the regenerative torque reduction control means 114 outputs to the regenerative coordination control means 110 a command of providing the torque-phase compensation control after the torque-phase start prediction time has elapsed from the start of the shift output from the stepped shift control means 102, and outputs to the regenerative coordination control means 110 a command of providing the inertia-phase compensation control instead of the torque-phase compensation control from the start time point of change in the electric motor rotation speed $N_{MG}$ (transmission input rotation speed $N_{IN}$) associated with the shift until the time point when the change is settled.

At the time of a coast down shift of the automatic transmission 18, the regenerative torque reduction control means 114 determines a torque compensation amount QTcom to be compensated as a drop-off D so as to suppress the drop-off D of the transmission output torque $T_{OUT}$ before providing the regenerative torque reduction control. Specifically, a temporal change in the transmission output torque $T_{OUT}$ during drop-off of the transmission output torque $T_{OUT}$ in the coast down shift of the automatic transmission 18 is empirically obtained and stored in advance in accordance with a degree of regenerative torque at the time of the shift, a type of the shift of the automatic transmission 18, and a vehicle state such as the transmission input rotation speed $N_{IN}$. The regenerative torque reduction control means 114 determines a torque-phase torque compensation amount QTcomt in the torque-phase compensation control and an inertia-phase torque compensation amount QTcomi in the inertia-phase compensation control for the torque compensation amount QTcom, based on the actual vehicle state, from the temporal change during drop-off of the transmission output torque $T_{OUT}$ stored in advance. The regenerative coordination control means 110 reduces the regenerative torque so as to realize the determined torque-phase torque compensation amount QTcomt in the torque-phase compensation control and reduces the regenerative torque so as to realize the determined inertia-phase torque compensation amount QTcomi in the inertia-phase compensation control. For example, the torque compensation amount QTcom is made larger when the transmission input rotation speed $N_{IN}$ is larger and is made larger when the regenerative torque at the time of shift is larger. This is because when the transmission input rotation speed N at the time of the coast down shift of the automatic transmission 18 is larger and when the regenerative torque is larger, the drop-off D of the transmission output torque $T_{OUT}$ at the time of the coast down shift tends to be larger. The type of the shift of the automatic transmission 18 indicates, for example, whether the coast down shift is a shift from the fourth speed to the third speed or a shift from the third speed to the second speed.

On the other hand, in this embodiment, for the oil pressure command value of the engagement devices related to the clutch-to-clutch shift, a value satisfying both the shift responsiveness and the shift shock suppression is empirically obtained and set in advance; however, the shift responsiveness may deteriorate or the shift shock may increase beyond the assumption due to temporal change of hydraulic control components (e.g., components such as friction materials making up the engagement devices) of the automatic transmission 18 and operating oil. Therefore, in this embodiment, leaning control of the oil pressure command value of the engagement devices related to clutch-to-clutch shift is provided for suppressing the shift shock while properly ensuring the shift responsiveness in the clutch-to-clutch shift of the automatic transmission 18.

Specifically, an oil pressure learning control portion, i.e., an oil pressure learning control means 116 sequentially detects a degree of change in the transmission input rotation speed $N_{IN}$ during the clutch-to-clutch shift, provides the leaning control of the oil pressure command value of the engagement devices related to the clutch-to-clutch shift such that the transmission input rotation speed $N_{IN}$ converges to a target value (predetermined degree of change) empirically obtained and set in advance for satisfying both the shift responsiveness and the shift shock suppression, and sets the next oil pressure command value of the engagement devices. For example, the oil pressure learning control means 116 sequentially detects an undershoot amount of the transmission input rotation speed $N_{IN}$ in the torque phase and provides the learning control of a release oil pressure of the release-side engagement device such that the undershoot amount converges to a predetermined undershoot amount empirically obtained and set in advance for satisfying both the shift responsiveness and the shift shock suppression. Additionally, the oil pressure learning control means 116 sequentially detects a change rate of the transmission input rotation speed $N_{IN}$ in the inertia phase and provides the learning control of an engagement oil pressure of the engagement-side engagement device such that the change rate converges to a predetermined change rate empirically obtained and set in advance for satisfying both the shift responsiveness and the shift shock suppression.

It is believed that the change tendency of the oil pressure command value in the oil pressure learning control is hardly uniquely applied to different types of shift such as power-on upshift and coast down shift. Therefore, it is desired to set an oil pressure learning value applied to a coast down shift when the coast down shift is executed. However, when a clutch-to-clutch shift for a coast down shift associated with regeneration is on the premise of the execution of the regenerative torque reduction control, it is difficult to determine whether the undershoot of the transmission input rotation speed $N_{IN}$ generated during the torque phase is caused because a rise in the engagement oil pressure is too late (or a reduction in the release oil pressure is too early) or because the regenerative torque (transmission input torque $T_{IN}$) is changed by the regenerate torque reduction control (particularly, the torque-phase compensation control). Therefore, the learning control of the hydraulic command value by the oil pressure learning control means 116 may become difficult or a proper learning value may not be set through the learning control.

Therefore, in this embodiment, at the time of a coast down shift of the automatic transmission 18 associated with regeneration, regenerative torque reduction control corresponding to the torque-phase compensation control of the regenerative torque reduction control is completed before the start of the torque phase during the clutch-to-clutch shift. In other words, at the time of a coast down shift of the automatic transmission 18 associated with regeneration, the regenerative torque reduction control is completed that reduces the regenerative torque of the electric motor MG depending on the drop-off D of the transmission output torque caused by the transmission output torque $T_{OUT}$ dropping during the torque phase in the clutch-to-clutch shift, before the start of the torque phase. For example, the regenerative torque reduction control corresponding to the torque-phase compensation control is started at the time of output of a shift command (shift output) by the stepped shift control means 102 for executing the clutch-to-clutch shift. As a result, the regenerative torque (transmission input torque $T_{IN}$) during the torque phase is stabilized (i.e., made substantially constant) and the oil pressure learning control can properly be provided with the effect of the regenerative torque reduction control eliminated as far as possible.

However, the torque-phase compensation control is the control provided during the torque phase to suppress the drop-off D of the transmission output torque $T_{OUT}$ during the torque phase as far as possible. Therefore, if the regenerative torque reduction control corresponding to the torque-phase compensation control is provided before the start of the torque phase, the transmission output torque $T_{OUT}$ not substantially changed originally is changed by the reduction of the regenerative torque. Therefore, as compared to the execution of the torque-phase compensation control during the torque phase, the shift shock may be increased before the start of the torque phase or during the torque phase. Therefore, the regenerative torque reduction control corresponding to the torque-phase compensation control provided before the start of the torque phase (hereinafter referred to as the regenerative torque reduction control before torque-phase start) is provided within ranges of a predetermined regenerative torque change rate and a predetermined regenerative torque change amount for achieving a change rate of the transmission output torque $T_{OUT}$ (a change rate of the vehicle deceleration G from another viewpoint) and a change amount of the vehicle deceleration G empirically obtained in advance so as to make the shift shock hardly felt (i.e., as a value making the shift shock hardly felt). Since it is believed that the change rate of the vehicle deceleration G has a greater effect on the shift shock as compared to the change amount of the vehicle deceleration G, the regenerative torque reduction control before torque-phase start may be provided at least within a range of the predetermined regenerative torque change rate. The predetermined regenerative torque change rate and the predetermined regenerative torque change amount can be calculated in advance from various specifications of the vehicle 10 such as a tire diameter, a differential ratio, and a gear ratio based on an allowable change rate and an allowable change amount of the vehicle deceleration G empirically obtained in advance as the vehicle deceleration G making the shift shock hardly felt.

If the regenerative torque reduction control before torque-phase start is provided within a range of the predetermined regenerative torque change rate, the regenerative torque reduction control before torque-phase start may be impossible to complete before the start of the torque phase if started from the time of the shift output, depending on a degree of the regenerative torque to be reduced. In this case, the regenerative torque reduction control before torque-phase start is started when the shift output by the stepped shift control means 102 is predicted. When the shift output is predicted is, for example, when it can be determined that the shift output is performed because the stepped shift control means 102 makes a shift determination from the shift map and, specifically, is a predetermined period from the shift determination until the shift output.

However, even if started from the predetermined period, the regenerative torque reduction control before torque-phase start may not be completed before the start of the torque phase. When the target deceleration G* set by the target deceleration control means 108 is larger, the regenerative torque generated through the regenerative control by the hybrid control means 104 also becomes larger and the regenerative torque to be reduced inevitably becomes larger. Therefore, considering that the shift shock is suppressed to be hardly felt, the regenerative torque reduction control before torque-phase start may not be completed before the start of the torque phase. Therefore, in the case of a larger regenerative torque, i.e., larger target deceleration G*, making the regenerative torque reduction control before torque-phase start impossible to complete before the start of the torque phase, the regenerative torque reduction control before torque-phase start is not provided and the torque-phase compensation control is provided during the torque phase. From another viewpoint, if the target deceleration G* is larger, proper oil pressure learning control is difficult in the first place and it is conceivable that the oil pressure learning control is not provided. Therefore, in such a case that the oil pressure learning control is not provided, the torque-phase compensation control during the torque phase is provided that can efficiently suppress the shift shock.

More specifically, a target deceleration determining portion, i.e., target deceleration determining means 118 determines whether the target deceleration G* set by the target deceleration control means 108 is equal to or less than a predetermined value. This predetermined value is a deceleration determination value obtained and set in advance for determining that the target deceleration G* is larger such that the regenerative torque reduction control before torque-phase start cannot be completed before the start of the torque phase.

The regenerative torque reduction control means 114 provides the regenerative torque reduction control before torque-phase start if the target deceleration determining means 118 determines that the target deceleration G* is equal to or less than the predetermined value, and provides the torque-phase compensation control during the torque phase if the target deceleration determining means 118 determines that the target deceleration G* exceeds the predetermined value.

Figure 5:
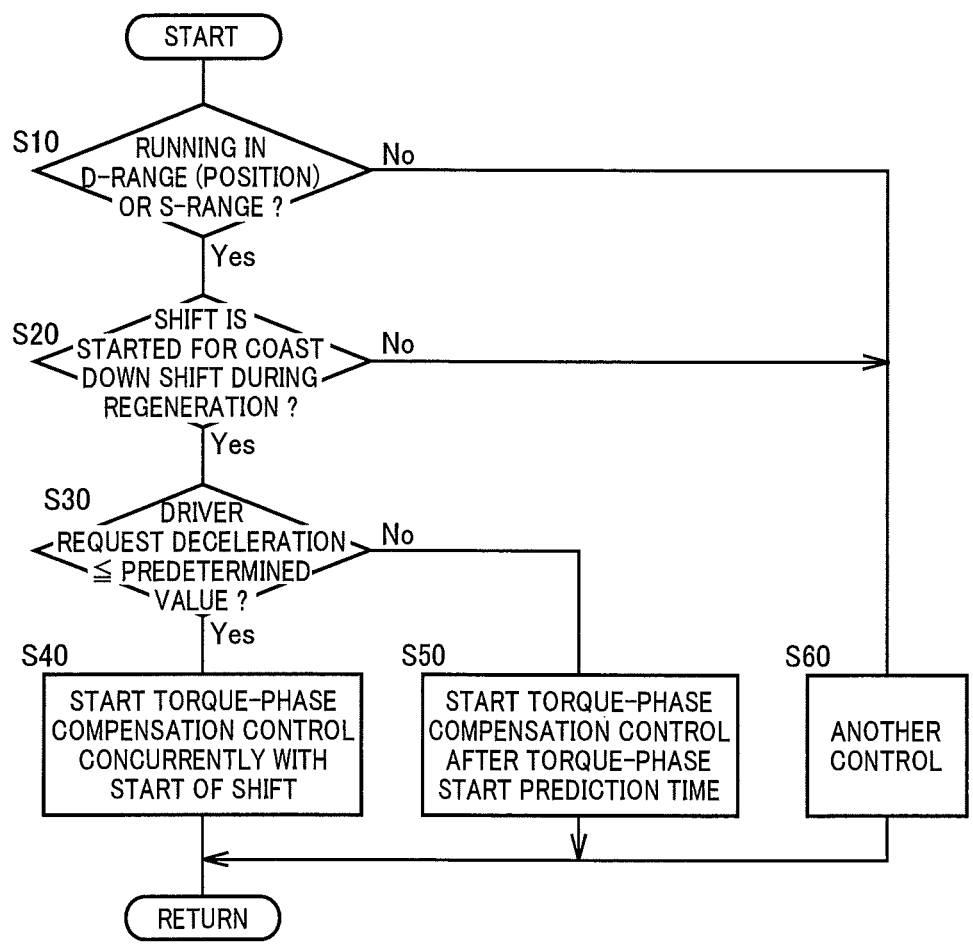
FIG. 5 is a flowchart for explaining a main portion of control operation of the electronic control device, i.e., control operation for properly providing the oil pressure learning control of the engagement devices related to a clutch-to-clutch shift for a coast down shift associated with regeneration.
Figure 6:
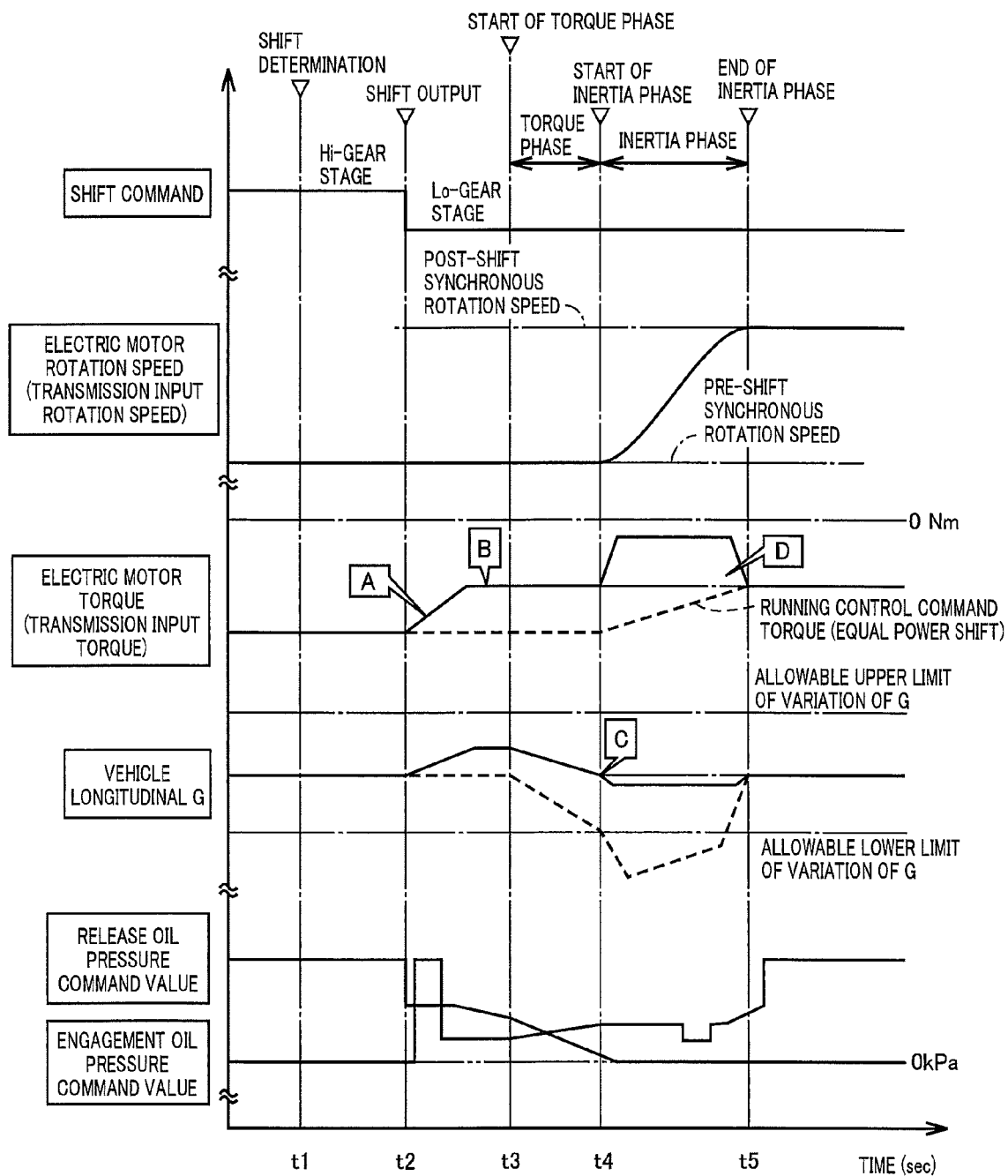
FIG. 6 is a time chart when the control operation depicted in the flowchart of FIG. 5 is performed and depicts an embodiment when the regenerative torque reduction control before torque-phase start is started at the same time with the shift output.
Figure 7:
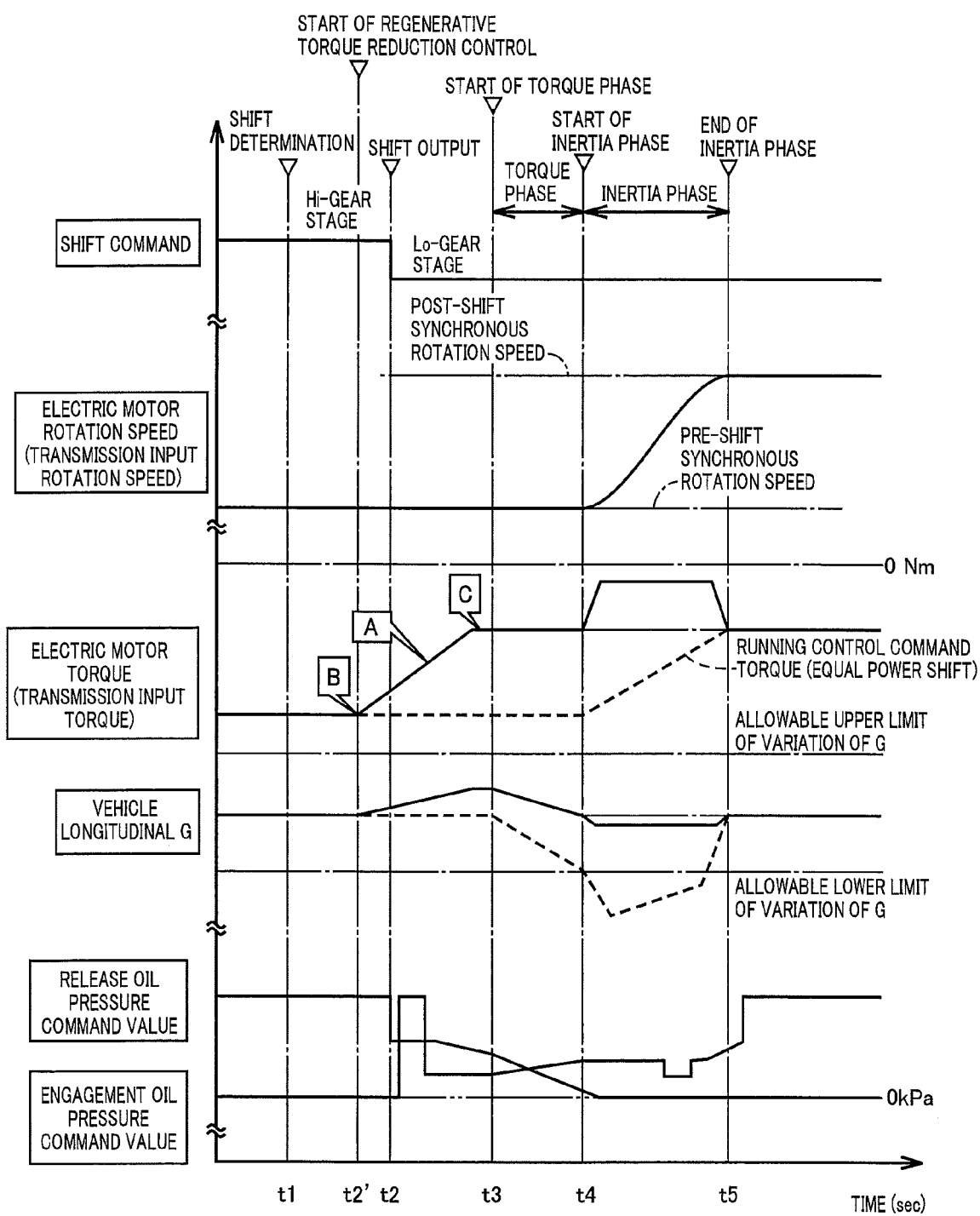
FIG. 7 a time chart when the control operation depicted in the flowchart of FIG. 5 is performed and depicts an embodiment when the regenerative torque reduction control before torque-phase start is started when the shift output is predicted.
Figure 8:
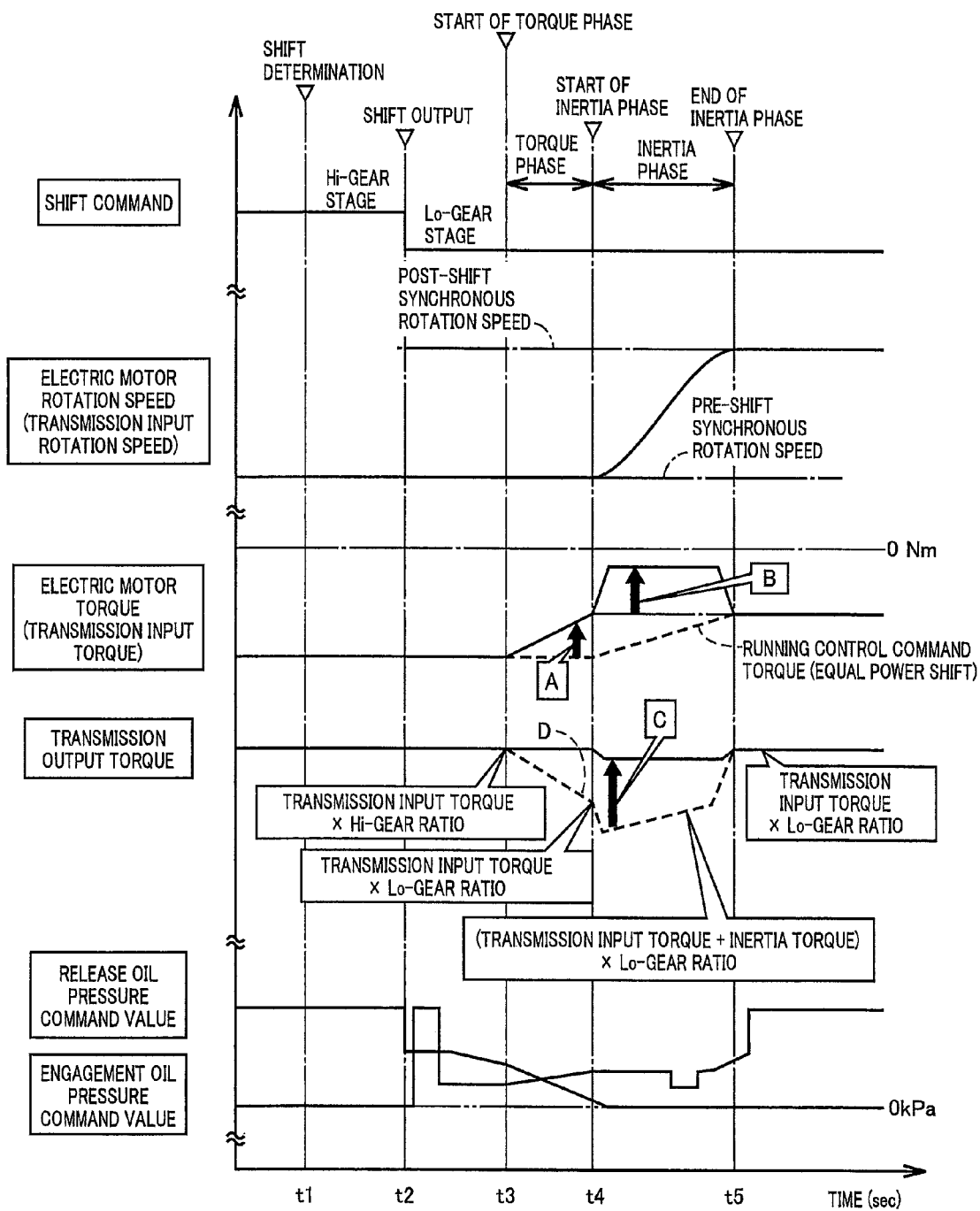
FIG. 8 a time chart when the control operation depicted in the flowchart of FIG. 5 is performed and depicts an embodiment when the torque-phase compensation control is started after the start of the torque phase.

FIG. 5 is a flowchart for explaining a main portion of control operation of the electronic control device 100, i.e., control operation for properly providing the oil pressure learning control of the engagement devices related to a clutch-to-clutch shift for a coast down shift associated with regeneration and is repeatedly executed with an extremely short cycle time, for example, on the order of few msec to a few tens of msec. FIGS. 6, 7, and 8 are time charts when the control operation depicted in the flowchart of FIG. 5 is performed; FIG. 6 depicts an embodiment when the regenerative torque reduction control before torque-phase start is started at the same time with the shift output; FIG. 7 depicts an embodiment when the regenerative torque reduction control before torque-phase start is started when the shift output is predicted; and FIG. 8 depicts an embodiment when the torque-phase compensation control is started after the start of the torque phase.

In FIG. 5, first, at step (hereinafter, step will be omitted) S10 corresponding to the running state determining means 106, it is determined based on the shift position $P_{SH}$ whether a vehicle is running at the "D (drive)" position or the "S" position, for example. If the determination at S10 is affirmative, it is determined at S20 corresponding to the torque reduction control generation determining means 112 whether the coast down shift in the regenerative range is determined (time t1 of FIGS. 6, 7, and 8), for example. If the determination at S20 is affirmative, it is determined at S30 corresponding to the target deceleration determining means 118 whether the target deceleration G* (driver request deceleration) is equal to or less than the predetermined value, for example. If the determination at S30 is affirmative, for example, the regenerative torque reduction control before torque-phase start is started at the same time with the shift output at S40 corresponding to the regenerative torque reduction control means 114 and is terminated before the start of the torque phase (from time t2 to time t3 of FIG. 6). Alternatively, if the regenerative torque is increased to a certain degree, the regenerative torque reduction control before torque-phase start is started when the shift output is predicted, i.e., in a predetermined period from the shift determination until the shift output, and is terminated before the start of the torque phase (from time t2' to time t3 of FIG. 7). If the target deceleration G* (driver request deceleration) is small, the regenerative torque is originally small and, therefore, it is believed that a user hardly notices the regenerative torque reduction control corresponding to the torque-phase compensation control if the control is provided before the torque phase actually starts. Therefore, the regenerative torque (transmission input torque $T_{IN}$) can be output stably (substantially constant) before the torque phase actually starts and the oil pressure learning control can properly be provided. In contrast, if the determination at S30 is negative, the torque-phase compensation control is started, for example, after the elapse of the torque-phase start prediction time at S50 corresponding to the regenerative torque reduction control means 114 and is provided until the start of the inertia phase (from time t3 to time t4 of FIG. 8). On the other hand, if the determination at S10 is negative or if the determination at S20 is negative, for example, control other than the regenerative torque reduction control is provided at S60.

In FIG. 6, a certain degree of the regenerative torque is reduced at the same time with the shift output within a range of a driver's dead band (A of FIG. 6). For example, if the transmission input rotation speed $N_{IN}$ is controlled to achieve weak undershoot, since the engagement oil pressure is gradually raised, a certain amount of time exists from the shift output until the start of the torque phase and the transmission input torque $T_{IN}$ can stably be output (B of FIG. 6). Since the absolute value of the transmission input torque $T_{IN}$ in the torque phase is reduced, the drop-off amount of the vehicle deceleration G in the torque phase is also reduced. If no tie-up occurs, the vehicle deceleration G immediately before the start of the inertia phase is a value before the shift or after the shift (C of FIG. 6). During the inertia phase, the drop-off of the vehicle deceleration G is reduced by the inertia-phase compensation control (D of FIG. 6).

In FIG. 7, as is the case with FIG. 6, a certain degree of the regenerative torque is reduced within a range of a driver's dead band. In this case, since the regenerative torque is larger, if the regenerative torque is reduced at the predetermined regenerative torque change rate, the regenerative torque reduction control before torque-phase start may not be terminated before the start of the torque phase and, therefore, the regenerative torque is reduced from the shift determination until the shift output (A, B of FIG. 7). As a result, the regenerative torque reduction control before torque-phase start can be completed before the torque phase actually starts (C of FIG. 7). The other details are the same as FIG. 6.

In FIG. 8, the torque-phase compensation control is provided from the start of the torque phase until the start of the inertial phase (A of FIG. 8) and the inertia-phase compensation control is provided during the inertia phase (B of FIG. 8), thereby reducing the drop-off of the transmission output torque $T_{OUT}$ (C of FIG. 8).

As described above, according to this embodiment, since the regenerative torque reduction control (torque-phase compensation control) in a coast down shift associated with regeneration is completed before the start of the torque phase, i.e., since regenerative torque reduction control corresponding to the torque-phase compensation control of the regenerative torque reduction control is completed before the start of the torque phase at the time of the coast down shift of the automatic transmission 18 associated with regeneration, the regenerative torque (i.e., the transmission input torque $T_{IN}$) can stably be output, i.e., can be maintained constant, during the torque phase. As a result, the behavior associated with a clutch-to-clutch shift during torque phase (e.g., a degree of change in the transmission input rotation speed $N_{IN}$) can entirely be attributable to the hydraulic control of the engagement devices, thereby ensuring the proper provision of the oil pressure learning control of the engagement devices related to the clutch-to-clutch shift for the coast down shift associated with regeneration. Since the regenerative torque is already reduced before the start of the torque phase and the absolute value of the transmission input torque $T_{IN}$ in the torque phase is made smaller as compared to the case of providing the regenerative torque reduction control during the torque phase, the drop-off amount of the transmission output torque $T_{OUT}$ (having the same meaning as the vehicle acceleration G etc.) in the torque phase is also made smaller. This suppresses the effect on the shift shock due to completion of the regenerative torque reduction control before the start of the torque phase. As a result, also because the proper provision of the oil pressure learning control properly suppresses the shift shock, the drivability is improved.

According to this embodiment, since the regenerative torque reduction control is started at the time of the shift output for executing a clutch-to-clutch shift, a period from the shift output until the start of the torque phase can be utilized to properly complete the regenerative torque reduction control before the start of the torque phase. Therefore, although the start timing of the regenerative torque reduction control is equivalent to the start of the hydraulic control of the clutch-to-clutch shift, since the oil pressure responsiveness is slower than the electric motor torque responsiveness, the regenerative torque reduction control can be terminated before the torque phase is actually started.

According to this embodiment, since the regenerative torque reduction control is started when the shift output for executing a clutch-to-clutch shift is predicted, the regenerative torque reduction control can properly be completed before the start of the torque phase by utilizing a period from when the shift output is predicted (e.g., during a period from a shift determination until shift output) until the start of the torque phase. The start timing of the regenerative torque reduction control is made earlier than the start of the hydraulic control of the clutch-to-clutch shift and the regenerative torque reduction control can more certainly be terminated before the start of the torque phase. For example, when the regenerative torque change rate is made larger at the time of the regenerative torque reduction control, an uncomfortable feeling is more easily given. Therefore, the regenerative torque change rate cannot be made larger even if the regenerative torque before a shift is relatively larger. As a result, if the regenerative torque reduction control is started at the same time with the start of shift output for the clutch-to-clutch shift, the regenerative torque reduction control may not be terminated before the start of the torque phase. In this regard, when the start timing of the regenerative torque reduction control is made earlier than the start of the shift output of the clutch-to-clutch shift, the regenerative torque reduction control can more certainly be terminated before the start of the torque phase.

According to this embodiment, since the regenerative torque reduction control is provided within a range of the predetermined regenerative torque change rate for achieving a change rate of the transmission output torque $T_{OUT}$ obtained in advance so as to make the shift shock hardly felt, even if the regenerative torque reduction control is provided before the start of the torque phase instead of during the torque phase, a user hardly feels a change in the transmission output torque $T_{OUT}$ (change in the vehicle acceleration G) and an increase in the shift shock can be suppressed to improve the drivability.

According to this embodiment, since the learning control of an oil pressure command value of the engagement devices involved with a clutch-to-clutch shift is provided such that a change in the transmission input rotation speed $N_{IN}$ converges to a target value (predetermined degree of change) or such that an undershoot amount of the transmission input rotation speed $N_{IN}$ converges to a predetermined undershoot amount during the coast down shift of the automatic transmission 18, a degree of change in the transmission input rotation speed $N_{IN}$ and an undershoot amount of the transmission input rotation speed $N_{IN}$ during the torque phase can entirely be attributable to the hydraulic control of the engagement devices, thereby ensuring the proper provision of the oil pressure learning control of the engagement devices related to the clutch-to-clutch shift of the coast down shift associated with regeneration.

Other embodiments of the present invention will be described. In the following description, the portions common to the embodiments are denoted by the same reference numerals and will not be described.

Second Embodiment

Although the vehicle 10 is a hybrid vehicle including the engine 14 and the electric motor MG as the drive force sources for running in the first embodiment, the present invention is applicable to other types of vehicles instead. In fact, the present invention is applicable to any vehicles including an automatic transmission capable of executing a clutch-to-clutch shift and an electric motor capable of power running and regeneration coupled to an input shaft of the automatic transmission in a power transmittable manner.

Figure 9:
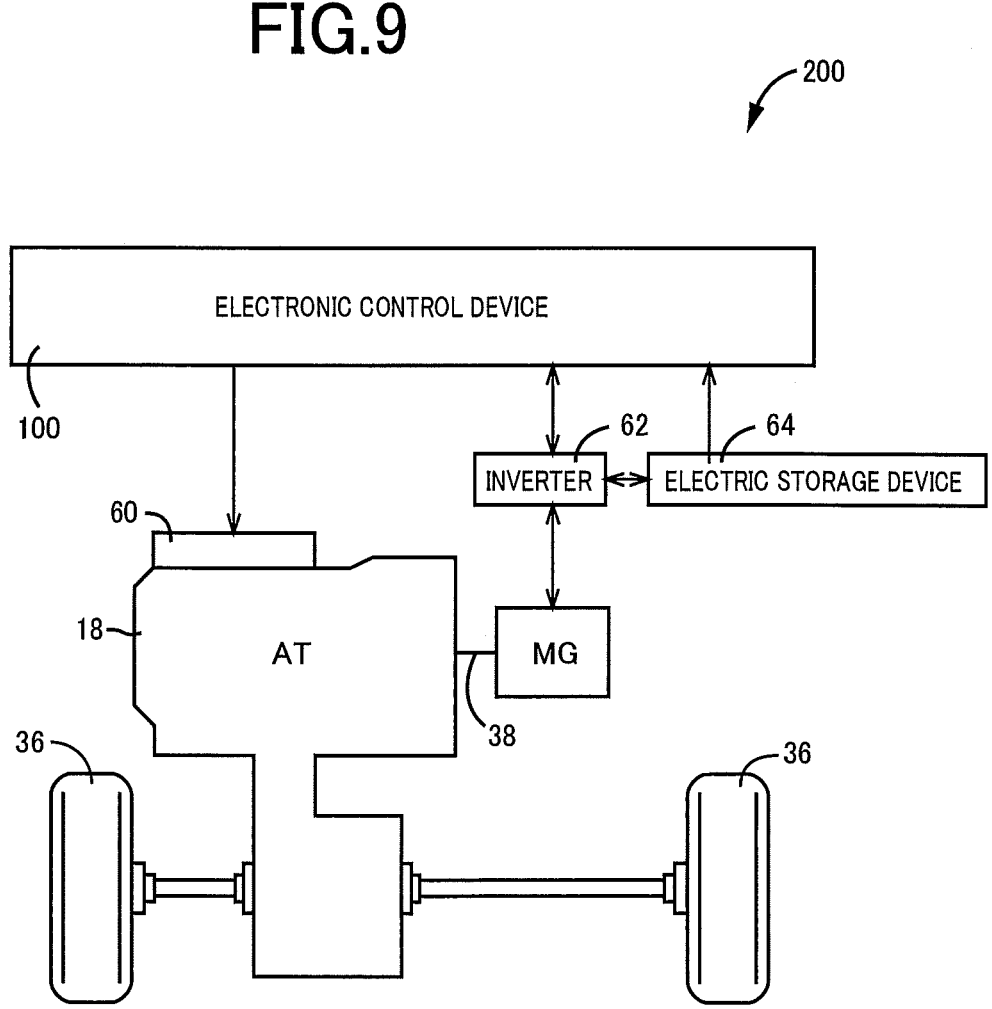
FIG. 9 is a schematic for explaining another embodiment to which the present invention is applied.

FIG. 9 is a schematic for explaining another embodiment to which the present invention is applied. In FIG. 9, a vehicle 200 is an electric vehicle including, for example, the automatic transmission 18 capable of executing a clutch-to-clutch shift and the electric motor MG capable of power running and regeneration coupled as a drive force source to the transmission input shaft 38 of the automatic transmission 18 in a power transmittable manner. Since the vehicle 200 does not include the engine 14 as a drive force source and uses only the electric motor MG as the drive force source, the hybrid control means 104 provides electric motor drive control including regenerative control using the electric motor MG instead of the hybrid drive control using the engine 14 and the electric motor MG. Therefore, as is the case with the vehicle 10, the vehicle 200 can execute a clutch-to-clutch shift while performing regeneration through the electric motor MG at the time of a coast down shift of the automatic transmission 18. Therefore, as similar to in the vehicle 10, in the vehicle 200, the control is provided that completes the regenerative torque reduction control (torque-phase compensation control) reducing the regenerative torque of the electric motor MG corresponding to a temporary drop of the transmission output torque $T_{OUT}$ during the torque phase in the coast down shift associated with regeneration, before the start of the torque phase. In other words, at the time of the coast down shift of the automatic transmission 18 associated with regeneration, the control is provided that completes regenerative torque reduction control corresponding to the torque-phase compensation control of the regenerative torque reduction control before the start of the torque phase.

As described above, according to this embodiment, since the electric motor MG and the automatic transmission 18 are included as is the case with the embodiment, the same effect as the embodiment can be acquired.

Third Embodiment

Figures 10, 11:
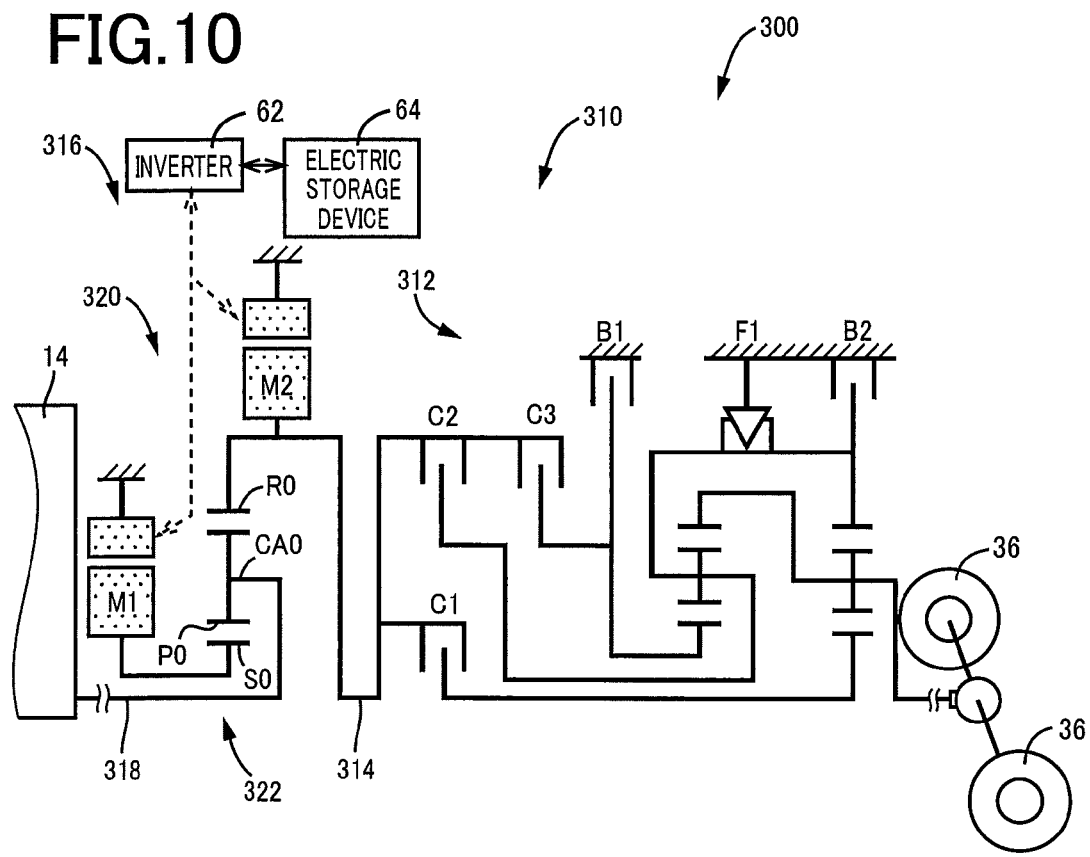
FIG. 10 is a schematic for explaining a further embodiment to which the present invention is applied.
FIG. 11 is an operation table for explaining a relationship between a shift operation of an automatic transmission of FIG. 10 and a combination of an operation of engagement devices used therein.

FIG. 10 is a schematic for explaining a further embodiment to which the present invention is applied. In FIG. 10, a vehicle 300 includes an automatic transmission 312 as a power transmission device 310 and a differential portion 316 coupled to a transmission input shaft 314 of the automatic transmission 312 in a power transmittable manner. The power transmission device 310 is preferably used for, for example, an FR (front-engine rear-drive) type vehicle in which the power transmission device 310 is longitudinally placed in the vehicle 300, and transmits to the drive wheels 36 the power of the engine 14 acting as a power source for running coupled to an input shaft 318.

The differential portion 316 is an electric differential device including a power distribution mechanism 320, a first electric motor M1 acting as a differential electric motor coupled to the power distribution mechanism 320 in a power transmittable trimmer for controlling the differential state of the power distribution mechanism 320, and a second electric motor M2 as an electric motor coupled in a power transmittable manner to the transmission input shaft 314 so as to rotate integrally therewith. The transmission input shaft 314 is an input-side rotating member of the automatic transmission 312 and also corresponds to an output-side rotating member of the differentia portion 316.

The first electric motor M1 and the second electric motor M2 are so-called motor generators having a function as a motor generating a mechanical drive force from electric energy and a function as an electric generator generating electric energy from a mechanical drive force. For example, the first electric motor M1 has a generator (electric generation) function for accepting a reaction force of the engine 14 and a motor (electric motor) function, and the second electric motor M2 has an electric motor function for acting as an electric motor for running outputting a drive force as a drive force source for running and an electric generation function of generating electric energy through regeneration from a reverse drive force from the drive wheels 36.

The power distribution mechanism 320 is a differential mechanism coupled to the engine 14 in a power transmittable manner, is mainly made up of a single pinion type differential-portion planetary gear device 322, for example, and is a mechanical mechanism mechanically distributing the output of the engine 14 input to the input shaft 318. In the power distribution mechanism 320, a differential-portion carrier CA0 is coupled to the engine 14; a differential-portion sun gear S0 is coupled to the first electric motor M1; and a differential-portion ring gear R0 is coupled to the transmission input shaft 314. The power distribution mechanism 320 configured as described above is put into a differential state in which a differential action is made operative by enabling the three elements of the differential-portion planetary gear device 322, i.e., the differential-portion sun gear S0, the differential-portion carrier CA0, and the differential-portion ring gear R0 to rotate relative to each other. When the power distribution mechanism 320 is put into the differential state, the differential portion 316 is also put into the differential state and the differential portion 316 is put into a continuously variable transmission state to function as an electric continuously variable transmission having a gear ratio γ0 (rotation speed of the input shaft 318/rotation speed of the transmission input shaft 314) continuously varied from a minimum value γ0min to a maximum value γ0max. When the power distribution mechanism 320 is put into the differential state in this way, an operating state (operation point) is controlled in one or both of the first electric motor M1 and the second electric motor M2 coupled to the power distribution mechanism 320 (the differential portion 316) in a power transmittable manner, thereby controlling the differential state of the power distribution mechanism 320, i.e., the differential state of the rotation speed of the input shaft 318 (engine rotation speed $N_E$) and the rotation speed of the transmission input shaft 314.

Since the electric energy generated by, for example, the first electric motor M1 is supplied through the inverter 62 to the electric storage device 64 and the second electric motor M2 in the vehicle 300, a main portion of the power of the engine 14 is mechanically transmitted to the transmission input shaft 314 while a portion of the power of the engine 14 is consumed for the electric generation of the first electric motor M1 and converted into electric energy; the electric energy is supplied through the inverter 62 to the electric storage device 64 and the second electric motor M2; and a drive force output from the second electric motor M2 due to the electric energy is transmitted to the transmission input shaft 314. The devices related to the electric energy from the generation by the first electric motor M1 related to the electric generation to the consumption by the second electric motor M2 related to driving make up an electric path from the conversion of a portion of the power of the engine 14 into electric energy to the conversion of the electric energy into mechanical energy.

As is the case with the automatic transmission 18 of the first embodiment, the automatic transmission 312 is a planetary-gear type multistage transmission making up a portion of the power transmission path between the engine 14 and the drive wheels 36 and acting as a stepped automatic transmission including a plurality of planetary gear devices with a plurality of gear ratios mechanically set in a stepwise manner. The automatic transmission 312 is, for example, a stepped transmission executing a so-called clutch-to-clutch shift frequently used in known vehicles and the engagement/release control of each of the clutches C1, C2, C3 and the brakes B1, B2 establishes each gear stage (each shift stage) of four forward speeds and one reverse speed as depicted in an engagement operation table of FIG. 11 depending on accelerator operation of a driver, a vehicle speed V, etc.

This embodiment includes the differential portion 316 having the second electric motor M2 coupled to the transmission input shaft 314 in a power transmittable manner and the engine 14 coupled to the differential portion 316 in a power transmittable manner. Therefore, for example, only an output torque of the second electric motor M2, i.e., an M2 torque $T_{M2}$, or a total torque of the M2 torque $T_{M2}$ and an engine torque $T_E$, or only the engine torque $T_E$ can be controlled as an input shaft torque of the automatic transmission 312 (AT input shaft torque $T_{AT}$). The engine torque $T_E$ acting as the AT input shaft torque $T_{AT}$ is an engine direct torque mechanically transmitted via the differential portion 316 to the transmission input shaft 314, for example.

In the vehicle 300 configured as described above, as is the case with the vehicle 10, the regenerative control is provided that puts the engine 14 into the non-driving state to convert kinetic energy of the vehicle 300 transmitted from the drive wheels 36 into the electric energy with the second electric motor M2 to improve the fuel efficiency during coasting or during braking with a foot brake. At the time of a coast down shift of the automatic transmission 312, a clutch-to-clutch shift can be executed while performing regeneration through the second electric motor M2. Therefore, in the vehicle 300, as is the case with the vehicle 10, the control is provided that completes the regenerative torque reduction control (torque-phase compensation control) reducing the regenerative torque of the second electric motor M2 corresponding to a temporary drop of the transmission output torque $T_{OUT}$ during the torque phase in the coast down shift associated with regeneration, before the start of the torque phase. In other words, at the time of the coast down shift of the automatic transmission 312 associated with regeneration, the control is provided that completes regenerative torque reduction control corresponding to the torque-phase compensation control of the regenerative torque reduction control before the start of the torque phase.

In the regenerative control hi the vehicle 300, for example, the regenerative control is provided such that the second electric motor M2 is rotationally driven and caused to operate as an electric generator by a reverse drive force transmitted from the drive wheels 36 toward the engine 14 so as to charge the electric storage device 64 via the inverter 62 with the electric energy, i.e., a second-electric-motor generation current. In this case, to suppress the drag of the stopped engine 14 and improve the fuel efficiency, the first electric motor M1 is put into a no-load state to idle and the engine rotation speed $N_E$ is maintained at zero or substantially zero as needed through the differential action of the differential portion 316.

However, input/output of electric power may be limited depending on the state of charge SOC of the electric storage device 64. For example, if input of electric power is limited in the electric storage device 64, an amount of regenerative electric power from the second electric motor M2 is limited or a portion or whole of regenerative electric power must be consumed by power running of the first electric motor M1.

Specifically, the first electric motor M1 outputs drive torque to raise the engine rotation speed $N_E$ from zero or substantially zero and takes reaction force from the drag (rotation resistance) of the engine 14 to consume a portion or whole of the regenerative electric power through the power running of the first electric motor M1. Therefore, the engine direct torque is mechanically transmitted via the differential portion 316 to the transmission input shaft 314. On the other hand, during a cold time of the engine 14 and catalyst, it may be necessary to operate the engine 14 for warm-up although drive force is not acquired. In such a case, since the reaction force of the engine torque $T_E$ is taken by electric generation of the first electric motor M1, the engine direct torque is mechanically transmitted via the differential portion 316 to the transmission input shaft 314. When the engine direct torque is transmitted to the transmission input shaft 314 during the regenerative control, the AT input shaft torque $T_{AT}$ is a total torque of the regenerative torque from the second electric motor M2 and the engine direct torque. Therefore, a total torque of the regenerative torque and the engine direct torque is reduced in the regenerative torque reduction control. Since the engine direct torque includes variations of engine torque $T_E$ and variations of the M1 torque $T_{M1}$ such as pumping and pulsation, the AT input shaft torque $T_{AT}$ is easily varied as compared to the case of the AT input shaft torque $T_{AT}$ consisting only of the regenerative torque from the second electric motor M2. Thus, a user may easily feel a change in the vehicle deceleration G.

Therefore, in this embodiment, if the first electric motor M1 outputs the regenerative torque or the drive torque in addition to the regeneration through the second electric motor M2 at the time of a coast down shift of the automatic transmission 312, the regenerative torque reduction control means 114 reduces a change rate of the AT input shaft torque $T_{AT}$ in the regenerative torque reduction control before torque-phase start as compared to the case that the first electric motor M1 does not output the regenerative torque or the drive torque. Because of the reduction in the change rate of the AT input shaft torque $T_{AT}$, the regenerative torque reduction control before torque-phase start may not be terminated before the start of the torque phase. Therefore, if the change rate of the AT input shaft torque $T_{AT}$ in the regenerative torque reduction control before torque-phase start is reduced, the regenerative torque reduction control means 114 makes the start timing of the regenerative torque reduction control before torque-phase start earlier as compared to the case that the change rate of the AT input shaft torque $T_{AT}$ is not reduced.

Figure 12:
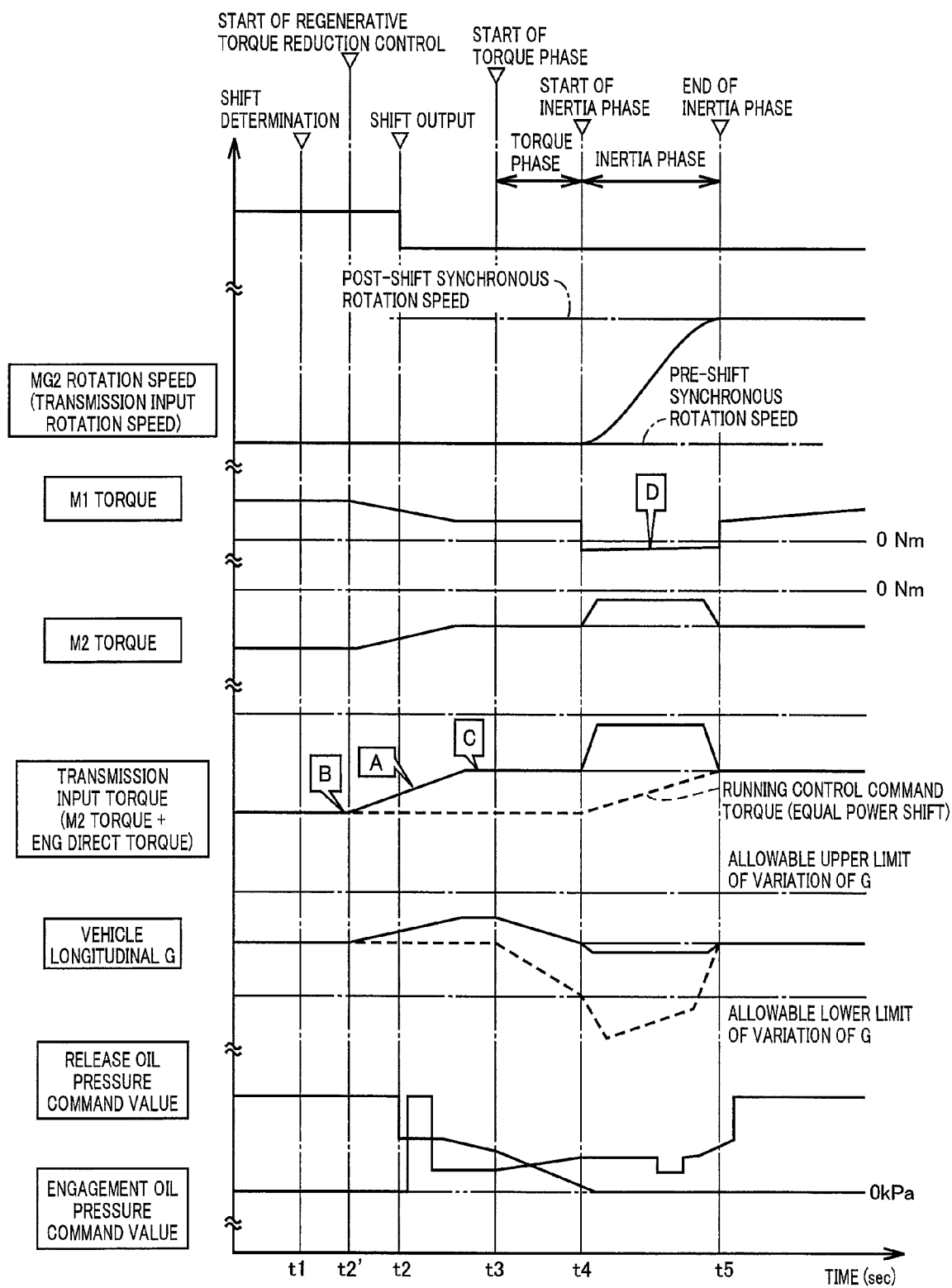
FIG. 12 is a time chart when the control of a third embodiment is provided.

FIG. 12 is a time chart when the control of this embodiment is provided. In FIG. 12, as is the case with FIG. 6, a certain degree of the regenerative torque is reduced within a range of a driver's dead band. In this case, as compared to the case that only the second electric motor M2 outputs the regenerative torque as in FIG. 6, the change rate of the AT input shaft torque $T_{AT}$ is reduced for a slower change (A of FIG. 12). The start timing of the regenerative torque reduction control before torque-phase start is made earlier by the reduction in the change rate of the AT input shaft torque $T_{AT}$ (B of FIG. 12). As a result, the regenerative torque reduction control before torque-phase start can be terminated before the torque phase is actually started (C of FIG. 12). During the inertia phase, M1 inertia cancel control is provided to prevent the engine rotation speed $N_E$ from being changed by a change in M2 rotation speed (D of FIG. 12).

As described above, according to this embodiment, since the second electric motor M2 and the automatic transmission 312 are included as is the case with the embodiment, the same effect as the embodiment can be acquired.

According to this embodiment, in the power transmission device 310 including the differential portion 316 and the automatic transmission 312, if the first electric motor M1 outputs the regenerative torque or the drive torque in addition to the regeneration through the second electric motor M2 at the time of a coast down shift of the automatic transmission 312, the change rate of the AT input shaft torque $T_{AT}$ in the regenerative torque reduction control before torque-phase start is reduced as compared to the case that the first electric motor M1 does not output the regenerative torque or the drive torque and, therefore, although a user more easily feels a change in the vehicle acceleration G if the regenerative torque reduction control before torque-phase start reduces the AT input shaft torque $T_{AT}$ that is a total torque of the regenerative torque from the second electric motor M2 and the engine direct torque because of the inclusion of the easily varying engine direct torque as compared to the case that the regenerative torque reduction control before torque-phase start reduces only the regenerative torque from the second electric motor M2, since the change rate of the AT input shaft torque $T_{AT}$ is reduced in the regenerative torque reduction control before torque-phase start, a user hardly feels a change in the vehicle acceleration G.

According to this embodiment, if the change rate of the AT input shaft torque $T_{AT}$ is reduced in the regenerative torque reduction control before torque-phase start, the start timing of the regenerative torque reduction control before torque-phase start is made earlier as compared to the case that the change rate of the AT input shaft torque $T_{AT}$ is not reduced and, therefore, although the regenerative torque reduction control before torque-phase start may not be terminated before the torque phase is actually started because of the reduction in the change rate of the AT input shaft torque $T_{AT}$ in the regenerative torque reduction control before torque-phase start, since the start timing of the regenerative torque reduction control before torque-phase start is made earlier, the regenerative torque reduction control before torque-phase start can be terminated before the torque phase is actually started.

According to this embodiment, when the first electric motor M1 outputs the drive torque corresponds to a case when a portion or whole of regenerative electric power from the second electric motor M2 is consumed by the first electric motor M1 because of input limitation of the electric storage device 64. Therefore, a user hardly feels a change in the vehicle acceleration G even during the input limitation of the electric storage device 64.

Although the embodiments of the present invention have been described in detail with reference to the drawings, the present invention can be implemented by combining the embodiments with each other and is applied in other forms.

For example, although the embodiments are implemented independently of each other in the embodiments, the embodiments may not necessarily independently be implemented and may be implemented in a combined manner as needed.

In the embodiments, if it is determined that the target deceleration G* is equal to or less than a predetermined value, the regenerative torque reduction control before torque-phase start is provided while if it is determined that the target deceleration G* exceeds the predetermined value, the torque-phase compensation control is provided during the torque phase; however, the regenerative torque reduction control before torque-phase start may be provided regardless of whether the target deceleration G* is equal to or less than the predetermined value. In such a case, the flowchart of FIG. 5 does not have to include steps S30 and S50.

Although the regenerative torque reduction control before torque-phase start is basically started at the same time with the shift output and is started in a predetermined period from the shift determination until the shift output if a certain degree of the regenerative torque should be reduced in the embodiments, the regenerative torque reduction control before torque-phase start may originally be started in the predetermined period.

Although the embodiments use the torque converter 16 as a hydraulic transmission device; the torque converter 16 may not necessarily be included and another hydraulic power transmission device such as a fluid coupling (fluid coupling) without a torque amplification effect may be used instead of the torque converter 16.

According to FIG. 10 of the embodiment, the differential portion 316 and the automatic transmission 312 are serially coupled; however, the present invention is applicable even if the differential portion 316 and the automatic transmission 312 are not mechanically separated of each other as long as the power transmission device 310 has an electric differential function capable of electrically changing a differential state and a function of shifting on the principle different from the shifting using the electric differential function as a whole.

The present invention is applicable to such a control form that the shift determination is made substantially concurrently with the shift output in the automatic transmissions 18 and 312.

The described embodiments are merely exemplary embodiments and the present invention may be implemented in variously modified and improved forms based on the knowledge of those skilled in the art.

NOMENCLATURE OF ELEMENTS

12: vehicle power transmission device
14: engine
18, 312: automatic transmission
38, 314: transmission input shaft (input shaft of the automatic transmission)
64: electric storage device
100: electronic control device (control device)
316: differential portion
320: power distribution mechanism (differential mechanism)
B: brakes (hydraulic friction engagement devices)
C: clutches (hydraulic friction engagement devices)
MG: electric motor
M1: first electric motor (differential electric motor)
M2: second electric motor (electric motor)

The invention claimed is:

1. A control device of a vehicle power transmission device having an automatic transmission shifted by engagement and release of hydraulic friction engagement devices to selectively establish a plurality of gear stages and an electric motor coupled to an input shaft of the automatic transmission in a power transmittable manner, the control device executing a clutch-to-clutch shift while performing regeneration through the electric motor at the time of a coast down shift of the automatic transmission, the control device completing regenerative torque reduction control to reduce a regenerative torque of the electric motor in a torque phase of the coast down shift before start of the torque phase in accordance with a drop-off of an output torque of the vehicle power transmission device.

2. The control device of a vehicle power transmission device of claim 1, wherein the regenerative torque reduction control is started at the time of output of a shift command for executing the clutch-to-clutch shift.

3. The control device of a vehicle power transmission device of claim 2, wherein the regenerative torque reduction control is provided within a range of a predetermined regenerative torque change rate.

4. The control device of a vehicle power transmission device of claim 2, wherein learning control of an oil pressure command value of the hydraulic friction engagement devices involved with the clutch-to-clutch shift is provided such that a change in input shaft rotation speed of the automatic transmission converges to a target value or such that an undershoot amount of the input shaft rotation speed of the automatic transmission converges during the coast down shift of the automatic transmission.

5. The control device of a vehicle power transmission device of claim 2, wherein
the vehicle power transmission device includes a differential portion coupled to an input shaft of the automatic transmission in a power transmittable manner, wherein
the differential portion is an electric differential device having the electric motor coupled in a power transmittable manner on the output side and having a differential mechanism coupled to an engine in a power transmittable manner and a differential electric motor coupled to the differential mechanism in a power transmittable manner such that a differential state of the differential mechanism is controlled by controlling an operating state of the differential electric motor, and wherein
if the differential electric motor outputs a regenerative torque or a drive torque in addition to regeneration through the electric motor at the time of a coast down shift of the automatic transmission, an input torque change rate of the automatic transmission in the regenerative torque reduction control is reduced as compared to the case that the differential electric motor does not output the regenerative torque or the drive torque.

6. The control device of a vehicle power transmission device of claim 5, wherein if the input torque change rate in the regenerative torque reduction control is reduced, start timing of the regenerative torque reduction control is made earlier as compared to the case of not reducing the input torque change rate.

7. The control device of a vehicle power transmission device of claim 5, wherein that the differential electric motor outputs the drive torque means that a portion or whole of regenerative electric power from the electric motor is consumed by the differential electric motor because of input limitation of an electric storage device giving/receiving electric power to/from the differential electric motor and the electric motor.

8. The control device of a vehicle power transmission device of claim 1, wherein the regenerative torque reduction control is started when output of a shift command for executing the clutch-to-clutch shift is predicted.

9. The control device of a vehicle power transmission device of claim 8, wherein the regenerative torque reduction control is provided within a range of a predetermined regenerative torque change rate.

10. The control device of a vehicle power transmission device of claim 8, wherein learning control of an oil pressure command value of the hydraulic friction engagement devices involved with the clutch-to-clutch shift is provided such that a change in input shaft rotation speed of the automatic transmission converges to a target value or such that an undershoot amount of the input shaft rotation speed of the automatic transmission converges during the coast down shift of the automatic transmission.

11. The control device of a vehicle power transmission device of claim 8, wherein
the vehicle power transmission device includes a differential portion coupled to an input shaft of the automatic transmission in a power transmittable manner, wherein
the differential portion is an electric differential device having the electric motor coupled in a power transmittable manner on the output side and having a differential mechanism coupled to an engine in a power transmittable manner and a differential electric motor coupled to the differential mechanism in a power transmittable manner such that a differential state of the differential mechanism is controlled by controlling an operating state of the differential electric motor, and wherein
if the differential electric motor outputs a regenerative torque or a drive torque in addition to regeneration through the electric motor at the time of a coast down shift of the automatic transmission, an input torque change rate of the automatic transmission in the regenerative torque reduction control is reduced as compared to the case that the differential electric motor does not output the regenerative torque or the drive torque.

12. The control device of a vehicle power transmission device of claim 11, wherein if the input torque change rate in the regenerative torque reduction control is reduced, start timing of the regenerative torque reduction control is made earlier as compared to the case of not reducing the input torque change rate.

13. The control device of a vehicle power transmission device of claim 11, wherein that the differential electric motor outputs the drive torque means that a portion or whole of regenerative electric power from the electric motor is consumed by the differential electric motor because of input limitation of an electric storage device giving/receiving electric power to/from the differential electric motor and the electric motor.

14. The control device of a vehicle power transmission device of claim 1, wherein the regenerative torque reduction control is provided within a range of a predetermined regenerative torque change rate.

15. The control device of a vehicle power transmission device of claim 1, wherein learning control of an oil pressure command value of the hydraulic friction engagement devices involved with the clutch-to-clutch shift is provided such that a change in input shaft rotation speed of the automatic transmission converges to a target value or such that an undershoot amount of the input shaft rotation speed of the automatic transmission converges during the coast down shift of the automatic transmission.

16. The control device of a vehicle power transmission device of claim 1, wherein
the vehicle power transmission device includes a differential portion coupled to an input shaft of the automatic transmission in a power transmittable manner, wherein
the differential portion is an electric differential device having the electric motor coupled in a power transmittable manner on the output side and having a differential mechanism coupled to an engine in a power transmittable manner and a differential electric motor coupled to the differential mechanism in a power transmittable manner such that a differential state of the differential mechanism is controlled by controlling an operating state of the differential electric motor, and wherein
if the differential electric motor outputs a regenerative torque or a drive torque in addition to regeneration through the electric motor at the time of a coast down shift of the automatic transmission, an input torque change rate of the automatic transmission in the regenerative torque reduction control is reduced as compared to the case that the differential electric motor does not output the regenerative torque or the drive torque.

17. The control device of a vehicle power transmission device of claim 16, wherein if the input torque change rate in the regenerative torque reduction control is reduced, start timing of the regenerative torque reduction control is made earlier as compared to the case of not reducing the input torque change rate.

18. The control device of a vehicle power transmission device of claim 16, wherein that the differential electric motor outputs the drive torque means that a portion or whole of regenerative electric power from the electric motor is consumed by the differential electric motor because of input limitation of an electric storage device giving/receiving electric power to/from the differential electric motor and the electric motor.

* * * * *

UNITED STATES PATENT AND TRADEMARK OFFICE
CERTIFICATE OF CORRECTION

| | |
|---|---|
| PATENT NO. | : 8,882,632 B2 |
| APPLICATION NO. | : 13/881665 |
| DATED | : November 11, 2014 |
| INVENTOR(S) | : Kenta Kumazaki et al. |

It is certified that error appears in the above-identified patent and that said Letters Patent is hereby corrected as shown below:

In the specification

At column 7, line 14, change "MG etc." to -- MG, etc. --.

At column 9, line 64, change "gear ratios ϒ (= the number" to -- gear ratios (= the number --.

At column 11, line 2, change "voltage $V_{SAT}$" to -- voltage $V_{BAT}$ --.

At column 13, line 14, change "If the miming state" to -- If the running state --.

At column 14, line 13, change "motor MG for" to -- motor MG, for --.

At column 15, line 13, change "device; after" to -- device, after --.

At column 16, line 19, change "Speed N at" to -- speed $N_{IN}$ at --.

At column 22, line 58, change "transmittable trimmer for" to -- transmittable manner for --.

At column 24, line 49, change "control hi the" to -- control in the --.

At column 27, line 8, change "device; the" to -- device, the --.

Signed and Sealed this
Twenty-first Day of July, 2015

Michelle K. Lee
*Director of the United States Patent and Trademark Office*